(12) United States Patent
Williams et al.

(10) Patent No.: US 10,100,623 B2
(45) Date of Patent: *Oct. 16, 2018

(54) INTRA-STROKE CYCLE TIMING FOR PUMPJACK FLUID PUMPING

(71) Applicant: KLD Energy Nano-Grid Systems, Inc., Austin, TX (US)

(72) Inventors: Bertrand Jeffery Williams, Austin, TX (US); Victor Sauers, II, Cedar Park, TX (US)

(73) Assignee: KLD Energy Nano-Grid Systems, Inc., Austin, TX (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/191,042

(22) Filed: Jun. 23, 2016

(65) Prior Publication Data

US 2017/0002635 A1    Jan. 5, 2017

Related U.S. Application Data

(60) Provisional application No. 62/187,041, filed on Jun. 30, 2015.

(51) Int. Cl.
*E21B 43/12* (2006.01)
*E21B 47/00* (2012.01)
*H02P 23/14* (2006.01)
*F04B 47/00* (2006.01)

(52) U.S. Cl.
CPC ........ *E21B 43/127* (2013.01); *E21B 47/0008* (2013.01); *F04B 47/00* (2013.01); *H02P 23/14* (2013.01)

(58) Field of Classification Search
CPC . E21B 43/127; E21B 43/126; E21B 2043/125
USPC ................... 417/904, 56, 58; 166/105.2, 68
See application file for complete search history.

(56) References Cited

U.S. PATENT DOCUMENTS

| | | | | |
|---|---|---|---|---|
| 4,661,751 | A * | 4/1987 | Werner | H02P 1/28 |
| | | | | 318/474 |
| 8,444,393 | B2 * | 5/2013 | Beck | E21B 43/126 |
| | | | | 417/53 |
| 9,041,332 | B2 * | 5/2015 | DaCunha | H02P 5/74 |
| | | | | 318/490 |
| 9,331,621 | B2 * | 5/2016 | Lee | E21B 43/127 |
| 9,628,016 | B2 * | 4/2017 | Lamascus | H02P 27/04 |
| 9,664,031 | B2 * | 5/2017 | Mills | E21B 47/0007 |
| 2004/0084179 | A1 * | 5/2004 | Watson | F04B 47/022 |
| | | | | 166/250.15 |
| 2005/0095140 | A1 * | 5/2005 | Boren | F04B 47/022 |
| | | | | 417/42 |

(Continued)

*Primary Examiner* — Kenneth L Thompson
(74) *Attorney, Agent, or Firm* — Husch Blackwell LLP

(57) ABSTRACT

A pumpjack is operated continuously over a sequence of two adjacent pump stroke cycles, by energizing an electric motor to operate the pumpjack over a first pump stroke cycle according to a motor speed profile over a plurality of discrete control periods within the cycle, while receiving sensory feedback from one or more sensors. In response to the feedback, and while continuing to operate the pumpjack, one or more speed adjustments are made to specific control periods, so as to alter the motor speed profile while continuing to operate the electric motor to drive the pump jack. The intra-cycle control optimizes flow while reacting to detrimental and changing conditions.

99 Claims, 14 Drawing Sheets

(56) References Cited

U.S. PATENT DOCUMENTS

| | | | |
|---|---|---|---|
| 2014/0129037 A1* | 5/2014 | Peterson | E21B 47/0008 700/282 |
| 2016/0003234 A1* | 1/2016 | Mills | F04B 49/065 417/18 |
| 2016/0003236 A1* | 1/2016 | Mills | F04B 49/20 417/15 |
| 2017/0002636 A1* | 1/2017 | Williams | E21B 43/127 |
| 2017/0002805 A1* | 1/2017 | Williams | F04B 49/20 |

* cited by examiner

300 ⮕

| DEFAULT MOTOR SPEED PROFILE ||
| CONTROL PERIOD | TARGET MOTOR SPEED (RPM) |
| --- | --- |
| 1 | 1100 |
| 2 | 1100 |
| 3 | 1100 |
| 4 | 1100 |
| 5 | 1100 |
| 6 | 1100 |
| 7 | 1100 |
| 8 | 1100 |
| 9 | 1100 |
| 10 | 1100 |
| 11 | 1100 |
| 12 | 1100 |
| 13 | 1100 |
| 14 | 1100 |
| 15 | 1100 |
| 16 | 1100 |
| 17 | 1100 |
| 18 | 1100 |
| 19 | 1100 |
| 20 | 1100 |
| 21 | 1100 |
| 22 | 1100 |
| 23 | 1100 |
| 24 | 1100 |
| 25 | 1100 |
| 26 | 1100 |
| 27 | 1100 |
| ... | ... |
| 100 | 1100 |

302 ⮕

| MOTOR SPEED ADJUSTMENT TABLE ||
| CONTROL PERIOD | SPEED ADJUSTMENT (RPM) |
| --- | --- |
| 1 | 0 |
| 2 | 5 |
| 3 | 10 |
| 4 | 15 |
| 5 | 20 |
| 6 | 25 |
| 7 | 30 |
| 8 | 35 |
| 9 | 40 |
| 10 | 40 |
| 11 | 35 |
| 12 | 30 |
| 13 | 25 |
| 14 | 20 |
| 15 | 19 |
| 16 | 18 |
| 17 | 18 |
| 18 | 18 |
| 19 | 18 |
| 20 | 20 |
| 21 | 25 |
| 22 | 30 |
| 23 | 35 |
| 24 | 40 |
| 25 | 45 |
| 26 | 50 |
| 27 | 55 |
| ... | ... |
| 100 | -5 |

304 ⮕ 306

| ADJUSTED MOTOR SPEED PROFILE ||
| CONTROL PERIOD | TARGET MOTOR SPEED (RPM) |
| --- | --- |
| 1 | 1100 |
| 2 | 1105 |
| 3 | 1110 |
| 4 | 1115 |
| 5 | 1120 |
| 6 | 1125 |
| 7 | 1130 |
| 8 | 1135 |
| 9 | 1140 |
| 10 | 1140 |
| 11 | 1135 |
| 12 | 1130 |
| 13 | 1125 |
| 14 | 1120 |
| 15 | 1119 |
| 16 | 1118 |
| 17 | 1118 |
| 18 | 1118 |
| 19 | 1118 |
| 20 | 1120 |
| 21 | 1125 |
| 22 | 1130 |
| 23 | 1135 |
| 24 | 1140 |
| 25 | 1145 |
| 26 | 1150 |
| 27 | 1155 |
| ... | ... |
| 100 | 1095 |

FIG. 3

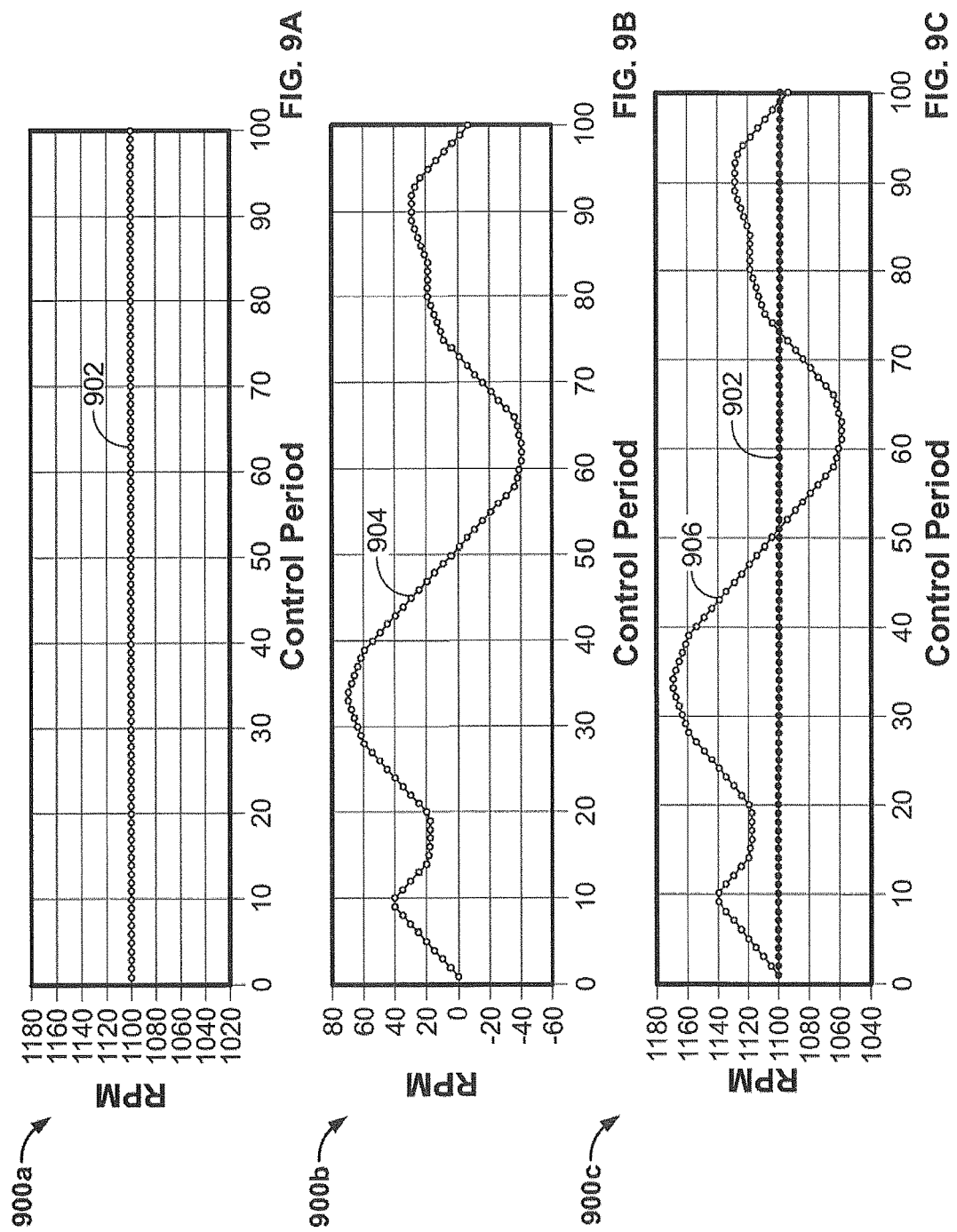

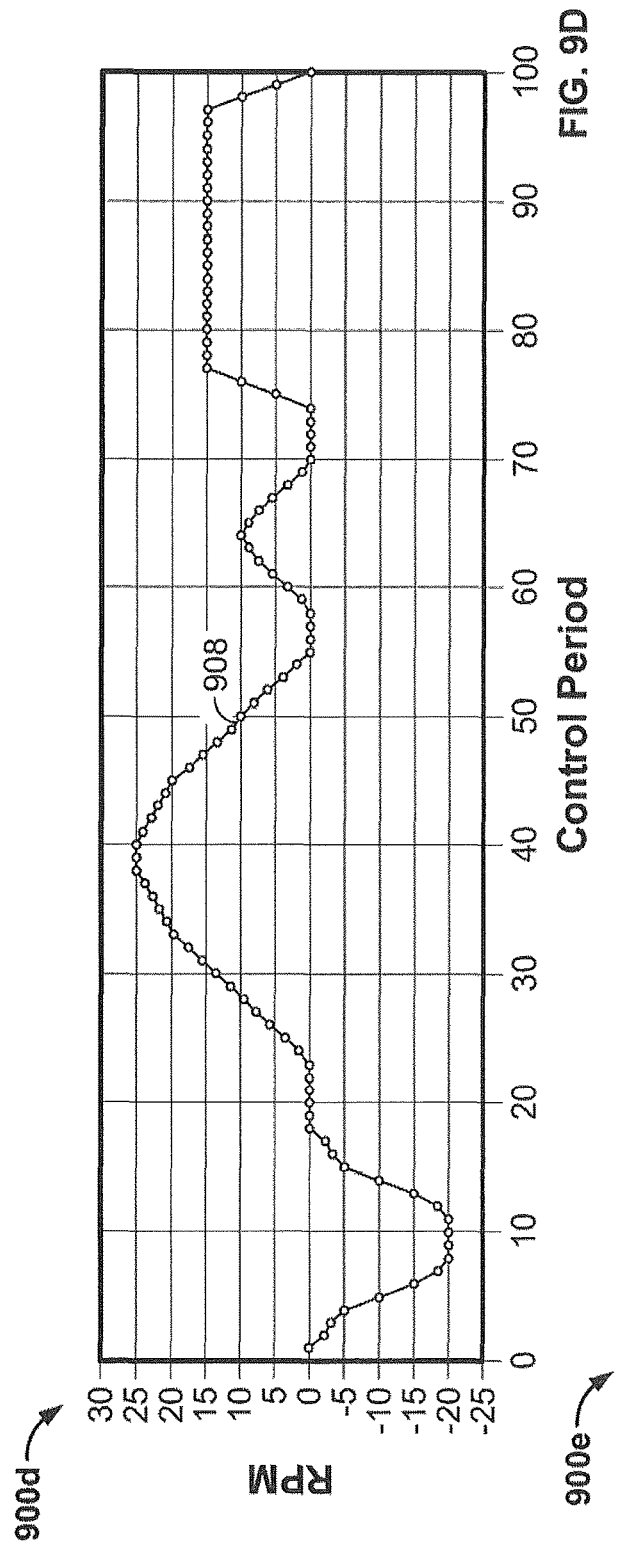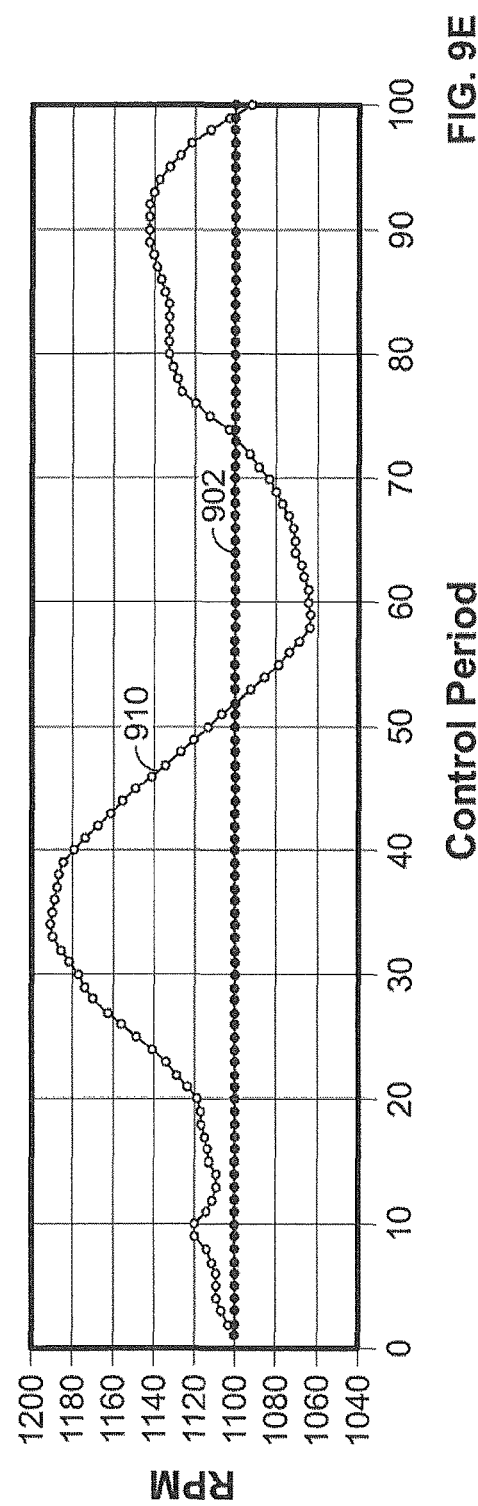

INTRA-STROKE CYCLE TIMING FOR PUMPJACK FLUID PUMPING

TECHNICAL FIELD

This invention relates generally to pumpjack fluid pumping, and more particularly to intra-stroke cycle timing of a pumpjack.

BACKGROUND

Reciprocating oil pumps are traditionally provided in the form of a beam-balanced pumpjack. Conventional pumpjacks provide a sinusoidal characteristic of reciprocating pumping motion dictated by geometry and power transmission from a fixed speed prime mover. Other types of pumping units, such as long stroke or hydraulically actuated pumping units, operate at a first constant speed during upstroke motion, and at a second constant speed during downstroke motion. Some pumping units utilize variable control of the prime mover to allow for an easier change in fixed speed, or to implement different speeds at various portions of the pumping cycle.

SUMMARY

This specification describes technologies related to systems and methods for pumpjack fluid pumping.

One aspect of the present invention features a method of operating a pumpjack continuously over a sequence of two adjacent pump stroke cycles. The method includes energizing an electric motor to operate the pumpjack over a first of the two pump stroke cycles, according to a first motor speed profile including a plurality of target motor speeds corresponding to each of a plurality of discrete control periods within the first pump stroke cycle. Sensory feedback is received during the first pump stroke cycle from one or more sensors mounted to monitor at least one operating condition of the pumpjack, and includes data collected during operation of the motor according to the first motor speed profile. In response to receiving the sensory feedback, and while continuing to operate the pumpjack, one or more speed adjustment values are determined, corresponding to a limited subset of the plurality of discrete control periods. The method includes altering the first motor speed profile based on the one or more adjustment values to provide a second motor speed profile, and operating the electric motor over the second of the two pump stroke cycles, according to the second motor speed profile.

In some examples, the first motor speed profile includes a predetermined default setting, and/or an altered version of a motor speed profile utilized in a previous pump stroke cycle of the sequence. Preferably, the plurality of discrete control periods of the first pump stroke cycle include at least 100 distinct and discrete control periods. In some examples, one or more of the discrete control periods of the first pump stroke cycle include a time duration of between about 5 and 100 milliseconds. In some examples, each of the plurality of discrete control periods of the first pump stroke include an identical time duration, such as a certain number of milliseconds.

In some examples, at least one of the sensors is a load sensor, such as a load cell arranged to be responsive to load in a polish rod of the pumpjack.

In some examples, at least one of the sensors is a crank rotation sensor, or a motor shaft position sensor, or a motor current sensor.

In some examples, determining the one or more speed adjustment values includes constructing a data structure relating position to load with respect to a polish rod of the pumpjack over the first pump stroke cycle, based on the sensory feedback. In some examples, determining the one or more speed adjustment values further includes comparing the data structure to one or more predetermined load limits, such as limits corresponds to the structural integrity of the polish rod, or to the structural integrity of a gear box coupled to the motor and the polish rod.

In some examples, determining the one or more speed adjustment values further includes identifying an abrupt load spike based on the data structure.

The data structure may include or represent a dynamometer surface card or a downhole pump card, for example.

In some embodiments, determining the one or more speed adjustment values includes detecting a detrimental operating condition within the first pump cycle based on the sensory feedback, and selecting a speed adjustment value to increase the target motor speed either: at a control period within the second pump stroke cycle preceding or subsequent to a different control period where the detrimental operating condition is likely to reoccur, at a control period within the second pump stroke cycle where the detrimental operating condition is likely to reoccur, or at a control period within the second pump stroke cycle preceding a different control period where the detrimental operating condition is likely to reoccur.

In some cases, the electric motor includes a regenerative drive and the method includes providing a breaking torque to control the descent of a rod system of the pumpjack during a downstroke of each of the pump stroke cycles while simultaneously converting kinetic energy of the rod system into electrical power.

Another aspect of the invention features a method of operating a pumpjack, including operating an electric motor of a pumpjack to pump fluid, according to a predetermined motor speed profile including a plurality of target motor speeds corresponding to each of a plurality of discrete control periods within a stroke cycle of the pumpjack, while receiving sensory feedback including data collected from one or more sensors mounted to monitor at least one operating condition of the pumpjack. While continuing to operate the electric motor to pump fluid, selected ones of the plurality of target motor speeds are incrementally increased over a plurality of sequential stroke cycles until a detrimental operating condition is detected based on sensory feedback. In response to detecting the detrimental operating condition, and as the pumpjack continues to pump fluid, a subset of the plurality of target motor speeds, selected based on a position of the detected detrimental operating condition within the stroke cycle, are decreased.

Various examples of the method according to this aspect of the invention include one or more features discussed above with respect to the first aspect.

Yet another aspect of the present invention features a pumpjack motor system including an electric motor coupled to a gear box of a pumpjack, one or more sensors mounted to monitor at least one operating condition of the pumpjack, and a local controller coupled to the electric motor and the one or more sensors. The controller is operable, while the pumpjack continuously pumps fluid, to control the motor according to a first motor speed profile including a plurality of target motor speeds corresponding to each of a plurality of discrete control periods within a single stroke cycle of the pumpjack, to receive sensory feedback from the one or more sensors (including data, including load data, collected during operation of the motor according to the first motor speed profile), to automatically increment a first set of the target motor speeds corresponding to portions of the stroke cycle outside of a predetermined load limit, based on the load data, to automatically decrement a second set of the target motor speeds corresponding to portions of the stroke cycle within the predetermined load limit (thereby generating a second motor speed profile), and to control the motor according to the second motor speed profile.

In some examples, at least one of the sensors includes a load sensor, such as a load cell mounted about a polish rod of the pumpjack or otherwise to be responsive to rod load. In some examples, at least one of the sensors includes a crank rotation sensor, a motor shaft position sensor, or a motor current sensor.

In some examples, the controller is further configured to identify portions of the stroke cycle outside of the predetermined load limit by constructing a data structure relating position to load with respect to a polish rod of the pumpjack over the stroke cycle based on the sensory feedback, then comparing the data structure to the predetermined load limit. In some examples, the predetermined load limit corresponds to the structural integrity of the polish rod. In some examples, the predetermined load limit corresponds to the structural integrity of a gear box coupled to the motor and the polish rod.

The electric motor may include a regenerative drive configured to provide a breaking torque to control the descent of a rod system of the pumpjack during a downstroke of each stroke cycle while simultaneously converting kinetic energy of the rod system into electrical power.

Yet another aspect of the invention features a pumpjack motor system including an electric motor coupled to a gear box of a pumpjack, one or more sensors mounted to monitor at least one operating condition of the pumpjack, and a local controller coupled to the electric motor and the one or more sensors. The local controller is operable, while the pumpjack continuously pumps fluid over two sequential pumping cycles, to control the electric motor through a first of the two sequential pumping cycles, according to a first motor speed profile including a plurality of target motor speeds corresponding to respective portions of the pumpjack stroke cycle, while receiving sensory feedback from the one or more sensors. The local controller is also configured to automatically adjust one or more of the target motor speeds as a function of the sensory feedback (to generate an adjusted motor speed profile), and to control the motor according to the adjusted motor speed profile during a second of the two sequential pumping cycles of the pumpjack.

In some examples, the first motor speed profile includes a predetermined default setting. In some examples, the first motor speed profile includes an altered version of a motor speed profile utilized in a previous pump stroke cycle of the sequence. In some examples, at least one of the sensors includes a load cell sensor. In some examples, the load cell sensors is mounted about a polish rod of the pumpjack. In some examples, at least one of the sensors includes a crank rotation sensor. In some examples, at least one of the sensors includes a motor shaft position sensor. In some examples, at least one of the sensors includes motor current sensor.

In some examples, the local controller is also configured to automatically adjust one or more of the target motor speeds by constructing a data structure relating position to load with respect to a polish rod of the pumpjack over the first pump stroke cycle based on the sensory feedback. In some examples, the controller determines the one or more speed adjustment values by comparing the data structure to one or more predetermined load limits, such as limits corresponding to the structural integrity of the polish rod or to the structural integrity of a gear box coupled to the motor and the polish rod. In some examples, the controller determines the one or more speed adjustment values by first identifying an abrupt load spike based on the data structure.

In some examples, the local controller is also configured to automatically adjust one or more of the target motor speeds by detecting a detrimental operating condition within the first pump cycle based on the sensory feedback, and selecting a speed adjustment value to increase the target motor speed at a control period within the second pump stroke cycle preceding or subsequent to a different control period where the detrimental operating condition is likely to reoccur, or selecting a speed adjustment value to decrease the target motor speed at a control period within the second pump stroke cycle where the detrimental operating condition is likely to reoccur, or selecting a speed adjustment value to decrease the target motor speed at a control period within the second pump stroke cycle preceding a different control period where the detrimental operating condition is likely to reoccur.

In some examples, the electric motor includes a regenerative drive configured to provide a breaking torque to control the descent of a rod system of the pumpjack during a downstroke of each of the stroke cycles while simultaneously converting kinetic energy of the rod system into electrical power.

Yet another aspect of the invention features a pumpjack motor system including an electric motor coupled to a gear box of a pumpjack, a controller operating as the pumpjack continuously pumps fluid, to: continually receive sensory feedback from one or more sensors mounted to monitor at least one operating condition of the pumpjack, determine, for each of a plurality of pumpjack stroke cycles, and as a function of the sensory feedback, a unique motor speed profile including a plurality of target motor speeds corresponding to each of a plurality of discrete periods within the respective stroke cycle of the pumpjack, automatically identify, from among the motor speed profiles corresponding to the respective pumpjack stroke cycles, an optimized motor speed profile with respect to pumping efficiency and one or more structural load limits, and then to control the electric motor according to the optimized motor speed profile.

In some examples, the pumpjack motor system further includes a variable frequency drive communicatively coupled to the controller and the motor, so as to receive a plurality of target motor speeds from the controller and regulate the motor to achieve the target motor speeds.

In some examples, at least one of the sensors includes a load sensor, such as a load cell mounted about a polish rod of the pumpjack or otherwise configured to respond to rod load. In some examples, at least one of the sensors includes a crank rotation sensor, or a motor shaft position sensor, or a motor current sensor. In some examples, the controller receives sensory feedback at a data sampling frequency of at least one data point per discrete control period of the pumping cycle. In some examples, the controller determines the unique motor speed profile by monitoring the anticipated load on the rods (e.g., the polish and sucker rods) and/or gear box of the pumpjack, and staying within predetermined stress limits or envelopes. In some examples, the controller detects the onset of pump off and adjusts a subsequent iteration of the motor speed profile to relieve the condition. In some examples, the controller detects a discrete stress event (e.g., a "rod binding"), and adjusts a subsequent iteration of the motor speed profile to relieve the condition.

In some examples, the controller is further configured to predict a future pump off or stress event based on historical pattern matching.

In some cases, the controller is configured to adjust the optimized motor speed profile based on changing operating conditions.

The unique motor speed profile for each pump cycle may be a version of the motor speed profile from a previous pump cycle altered according to a speed adjustment applied to one or more target motor speeds. In some examples, the magnitude of the speed adjustment is limited according to a predetermined maximum target speed difference between adjacent cycle portions. In some applications, the speed adjustment includes a speed decrement determined based on a detected deviation from a historic load profile.

In some examples, the electric motor includes a regenerative drive configured to provide a breaking torque to control the descent of a rod system of the pumpjack during a downstroke of each stroke cycle while simultaneously converting kinetic energy of the rod system into electrical power.

Yet another aspect of the invention features a method of operating a pumpjack, including operating an electric motor of a pumpjack to pump fluid, according to a predetermined motor speed profile including a plurality of target motor speeds corresponding to each of a plurality of discrete control periods within a stroke cycle of the pumpjack, while receiving sensory feedback including data collected from one or more sensors mounted to monitor at least one operating condition of the pumpjack. While continuing to operate the electric motor to pump fluid, one or more of the plurality of target motor speeds are increased over a plurality of stroke cycles until an onset of a detrimental operating condition is detected based on sensory feedback. In response to detecting the onset of the detrimental operating condition, and as the pumpjack continues to pump fluid, the motor speed profile is adjusted to simultaneously avoid the detrimental operating condition and increase the rate of fluid production by: decreasing a first subset of the plurality of target motor speeds within a first region of the stroke cycle, and increasing a second subset of the plurality of target motor speeds within a second region of the stroke cycle.

Various examples of this aspect include one or more features listed above with respect to other inventive aspects of the invention.

Yet another aspect of the invention features a method of pumping fluid, including operating an electric motor of a pumpjack to pump fluid, according to a predetermined motor speed profile including a plurality of target motor speeds corresponding to each of a plurality of discrete pump stroke cycle segments, while receiving load data from one or more sensors mounted to monitor at least one operating condition of the pumpjack, and storing and updating a pump cycle load profile based on the received load data over a period of several pump stroke cycles. In response to detecting load data deviating from the load profile by more than a predetermined deviation threshold, the method includes automatically decrementing a subset of the plurality of target motor speeds selected based on a position of the deviating load data within the stroke cycle.

In some examples, the detected load-data deviation is indicative of a rod load spike (e.g., binding). In some examples, the detected load-data deviation is indicative of a pump-off condition. In some examples, the detected load-data deviation is indicative of a gearbox torque transfer anomaly (e.g., caused by a broken tooth or a binding bearing).

Yet another aspect of the invention features a pumpjack motor system that includes an electric motor coupled to a gear box of a pumpjack, one or more sensors mounted to monitor at least one operating condition of the pumpjack during operation of the motor, and a variable frequency drive controller coupled to the motor and operable to control the motor in accordance with a varying motor speed profile over a pumping cycle of the pumpjack, while applying voltage to the motor. The drive controller is configured to determine, based on sensory feedback from the one or more sensors, a pumping cycle load profile, to automatically determine, based on the pumping cycle load profile, a varying voltage profile, and to control the motor in accordance with the varying motor speed profile while applying the varying voltage profile to the motor.

Yet another aspect of the invention features a method of operating a pumpjack, including operating an electric motor driving the pumpjack according to a varying motor speed profile during a first pump stroke cycle of the pumpjack (the motor speed profile including a plurality of target motor speeds corresponding to each of a plurality of discrete control periods), receiving sensory feedback from one or more sensors mounted to monitor at least one operating condition of the pumpjack (the sensory feedback including data collected during the first pump stroke cycle), determining a pump cycle load profile based on the sensory feedback (the pump cycle load profile corresponding to a plurality of torque loads of the electric motor at each of the discrete control periods of the first pump stroke cycle), automatically determining, based on the pump cycle load profile, a varying voltage profile, and operating the electric motor according to the varying motor speed profile and the varying voltage profile during a second pump stroke cycle of the pumpjack.

Yet another aspect of the invention features a method of operating a pumpjack continuously over a sequence of pump stroke cycles. The method includes energizing an electric motor to operate the pumpjack over a first pump stroke cycle, according to a first motor speed profile including a plurality of target motor speeds corresponding to each of a plurality of discrete control periods within the first pump stroke cycle, receiving sensory feedback during the first pump stroke cycle from one or more sensors mounted to monitor at least one operating condition of the pumpjack, the sensory feedback including data collected during operation of the motor according to the first motor speed profile, and detecting, while continuing to operate the pumpjack, a detrimental operating condition within the first pump stroke cycle based on the sensory feedback. In response to the detection, the method includes determining one or more speed adjustment values corresponding to a limited subset of the plurality of discrete control periods, altering the first motor speed profile based on the one or more adjustment values to provide a second motor speed profile, and operating the electric motor over a second pump stroke cycle, according to the second motor speed profile.

Yet another aspect of the invention features a method of operating a pumpjack, including operating an electric motor of a pumpjack to pump fluid, according to a predetermined motor speed profile including a plurality of target motor speeds corresponding to each of a plurality of discrete control periods within a stroke cycle of the pumpjack, while receiving sensory feedback including data collected from one or more sensors mounted to monitor at least one operating condition of the pumpjack. The predetermined motor speed profile corresponds to an optimized stroke timing curve determined during one or more previous stroke cycles of the pumpjack. While continuing to operate the electric motor to pump fluid, one or more of the plurality of target motor speeds is/are increased over a plurality of stroke cycles until a detrimental operating condition is detected based on sensory feedback. The method also includes, in response to detecting the detrimental operating condition, and as the pumpjack continues to pump fluid, decreasing a subset of the plurality of target motor speeds selected based on a position of the detected detrimental operating condition within the stroke cycle.

Yet another aspect of the invention features a pumpjack motor system, including an electric motor coupled to a gear box of a pumpjack, one or more sensors mounted to monitor at least one operating condition of the pumpjack, and a local controller coupled to the electric motor and the one or more sensors. The local controller is operable, while the pumpjack continuously pumps fluid over two sequential pumping cycles, to control the electric motor through a first of the two sequential pumping cycles, according to a first motor speed profile including a plurality of target motor speeds corresponding to respective portions of the pumpjack stroke cycle, while receiving sensory feedback from the one or more sensors; detect a detrimental operating condition within the first pump stroke cycle based on the sensory feedback. In response to the detection, the local controller automatically adjusts one or more of the target motor speeds as a function of the sensory feedback, to generate an adjusted motor speed profile, and controls the motor according to the adjusted motor speed profile during a second of the two sequential pumping cycles of the pumpjack.

Various examples of methods or systems corresponding to one or more of the described aspects of the invention discussed herein may advantageously provide improved fluid production rate of a pumpjack unit, and/or improved pumping efficiency, by implementing optimization techniques designed to increase the pumping rate, pump efficiency and/or pump stroke length by automatically adjusting the pumping speed throughout the pump stroke cycle, in response to local conditions. The optimization techniques may be conducted without user interaction, by a local controller without employing computationally complex mathematical simulations. Thus, the optimization techniques may be implemented quickly (e.g., in response to changing downhole conditions) and without interruption of the pumping process.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is diagram illustrating the modification of a default motor speed profile to provide an adjusted motor speed profile.

FIGS. 9A-9E are graphs illustrating the progressive modification of pumpjack stroke cycle according to an iterative tuning process.

Many of the features are exaggerated to better show the features, process steps, and results.

DETAILED DESCRIPTION

One or more implementations of the present disclosure include pumpjacks and pumpjack motor systems, as well as techniques for operating the same, where the controller facilitates tuning and adaptation of the stroke timing by dynamically (e.g., on a stroke cycle interval basis) adjusting motor RPM to optimize a broad set of configurable parameters, including overall system efficiency and various stress conditions. In some examples, the controller can be implemented by a moderately capable local processor, so as to avoid exceedingly complex mathematical computations that may delay adjustment of the stroke timing. In some examples, the controller utilizes a combination of mathematically predictive and partially predictive empirical (e.g., Perturb-now and Observe-later) algorithms for dynamic stroke-timing modification.

Figure 1:
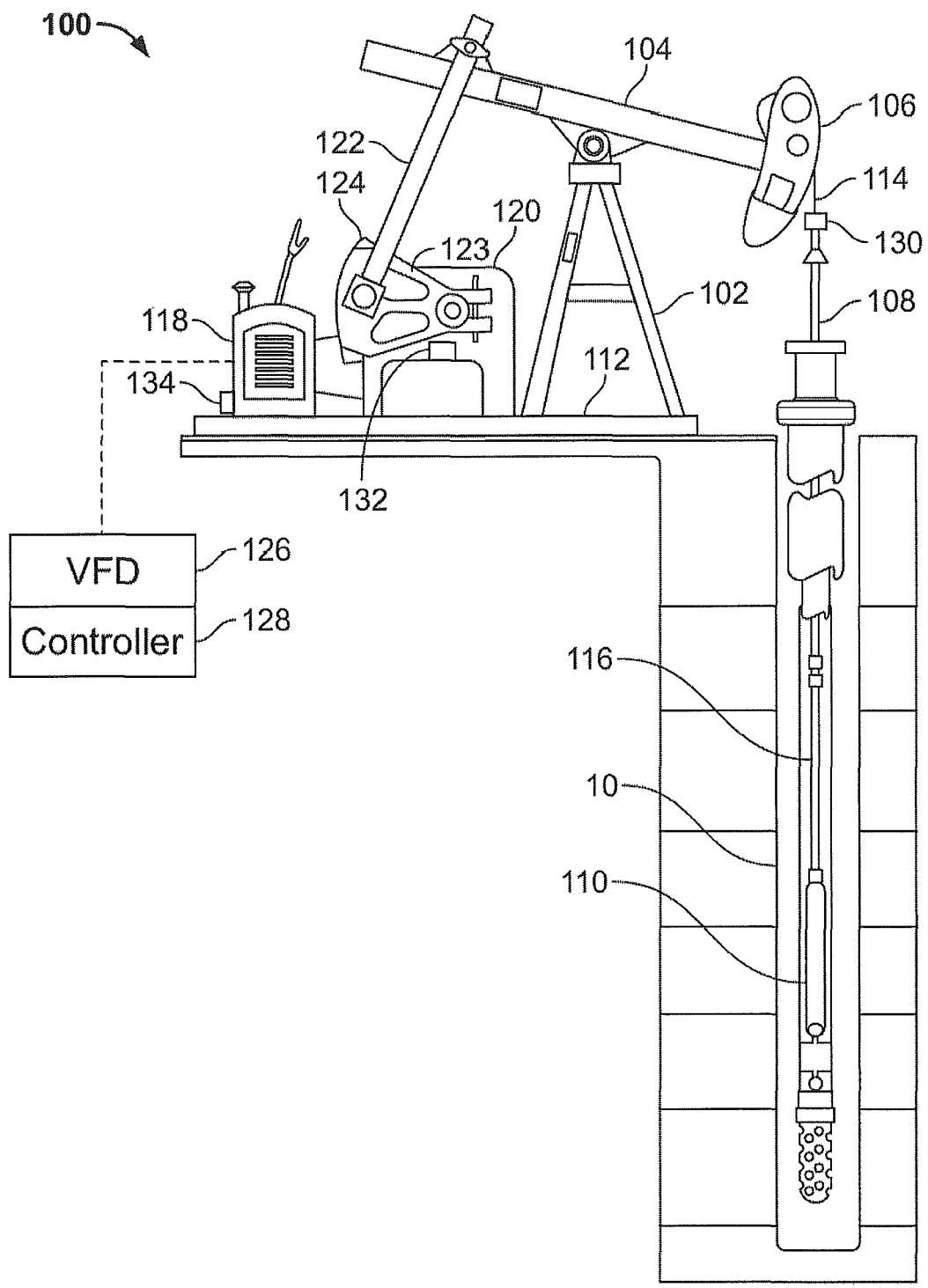
FIG. 1 is a schematic view of a pumpjack in accordance with one or more embodiments of the present disclosure.

Referring first to FIG. 1, a pumpjack 100 includes a frame 102 (sometimes referred to as a "Sampson post"), a walking beam 104, a horsehead 106, a polish rod 108, and a pump 110. The frame 102 is supported on a substantially flat base 112. The walking beam 104 is pivotally coupled (e.g., journaled) to the crest of the frame 102. The horsehead 106 is coupled to a front end of the walking beam 104, and therefore moves vertically upward and downward as the walking beam 104 pivots about the frame 102. The polish rod 108 is coupled to the horsehead 106 by a cable 114 (sometimes referred to as a "bridal") and extends downward therefrom to project into the wellbore 10. The curved face of the horsehead 106 ensures that the polish rod 108 is lowered and raised in a straight line. The pump 110 is located towards the bottom of the wellbore 10, coupled to the polish rod 108 by an intervening sucker rod 116. Although depicted in FIG. 1 as a single component, the sucker rod 116 may be provided as a string of multiple rod segments coupled to one another in an end-to-end arrangement. In some embodiments, the pump 110 includes two valves and a plunger contained within a tubular pump barrel. During the "upstroke" of the pump—that is, when the plunger is pulled upward by the sucker rod 116—the top valve (sometimes referred to as the "riding valve") closes and the bottom valve (sometimes referred to as the "standing valve") opens. Fluid in the portion of the pump barrel above the riding valve is drawn upward with the plunger, and the bottom portion of the pump barrel is simultaneously filled with fluid that enters the bottom of the wellbore 10 via perforations that have made through the surrounding casing. During the "downstroke" of the pump 110—that is, when the plunger is pushed downward by the sucker rod 116—the riding valve opens and the standing valve closes, which allows fluid from the bottom portion of the pump barrel to flow through the riding valve. An upstroke-downstroke pair is referred to as a "stroke cycle."

The rod system (e.g., the polish rod 108 and the sucker rod 116) carries a continuously varying load due to the reciprocating motion of the horsehead 106 and the associated fluid movement of the pump 110. The maximum load occurs shortly after the beginning of the upstroke, when the riding valve closes. The polish rod 108 must carry the full weight of the fluids, the rod system, and the added inertial effects that occur as the motion of the rods is reversed. The minimum load occurs shortly after the beginning of the downstroke, as the riding valve opens. At that point, the rod system no longer carries the fluid load and the inertial effects are reversed, thereby reducing the total rod load below the weight of the rods and the produced fluids. The rod system continuously stretches and contracts in response to the varying load. In addition, because of the elasticity of the sucker rod 116, which is usually of substantial length (e.g., over 5,000 ft.), large stress waves run up and down the rod in response to the various applied forces (e.g., the above described loads, as well as mechanical and fluid friction). These stress waves may cause the sucker rod 116 to break if they become excessive.

The walking beam 104 is driven by powertrain assembly including a prime mover 118, a reduction gearbox 120, and a piloting shaft 122 (sometimes referred to as a "Pitman arm"). The prime mover 118 drives the gearbox 120 through a belt system (not shown). The gearbox 120 imparts rotary motion into the proximal end of the piloting shaft 122 via a rotating crank 123. The distal end of the piloting shaft 122 is coupled to a rear end of the walking beam 104, and rocks the walking beam 104 back and forth in a pivoting motion about the frame 102, thus moving the horsehead 106 up and down as described above. In this example, the free end of the rotating crank 123 carries a counterweight 124, which at least partially offsets the weight of the rods (e.g., the polish rod 108 and sucker rod 116) and fluid to assist the prime mover 118 during the upstroke of the pump 110, and provides substantial resistance against the prime mover 118 to inhibit freefall of the rod system and pump 110 during the downstroke.

In this example, the prime mover 118 is provided in the form of an electrical induction motor (e.g., a high efficiency Nema B motor) operated by a variable frequency drive ("VFD") 126. The VFD 126 regulates the speed and torque output of the prime mover 118 by varying input frequency and voltage. In some embodiments, the VFD 126 includes appropriate hardware and circuitry (e.g., processors, memory, and I/O components) to regulate the speed and torque output based on one or more setpoint values. A controller 128 communicatively coupled to the VFD 126 includes appropriate hardware and circuitry (e.g., processors, memory, and I/O components) so as to achieve any of the control operations described herein. For example, the controller 128 may be configured to provide a target motor speed and/or a target motor torque setpoint to the VFD 126. In some implementations, the controller 128 may be implemented locally with the VFD 126 (e.g., fully or partially integrated therewith) or located at a remote location with communication between the components being conducted across a wired or wireless link (e.g., wired radio, the Internet, wireless cellular network, telephone network or satellite communication). In some examples, the prime mover 118 is further equipped with a regenerative drive provided for the dual purpose of providing a braking (or negative) torque to control the descent of the rod system and simultaneously converting the kinetic energy of the downward moving rod system into electrical power. Thus, the pumpjack is able to recapture at least a portion of its power draw from the grid as it operates according to the various tuning and monitoring techniques described in the present disclosure. Recaptured power can be stored, used for lifting of the prime mover during a subsequent stroke interval, or pushed back to the grid.

One or more aspects of the present disclosure are based on a realization that the timing of the stroke cycle of the pump 110 can be dynamically adjusted via the controller 128 without physically altering the pumpjack components discussed above (e.g., the gearbox 120, the piloting shaft 122, and the crank 123). For example, the controller 128 can provide a motor speed profile to the VFD 126 that includes a plurality of varying target motor speeds corresponding to each of a plurality of discrete control periods within a pump stroke cycle. In some embodiments, the motor speed profile may be determined by the controller 128 so as to improve the production of fluid from the pump 110. In some embodiments, the motor speed profile may be determined by the controller 128 so as to mitigate or decrease the risk of pump-off (a condition where the lower portion of the pump barrel is not filled with fluid during the upstroke, causing the plunger to pound into the fluid during the downstroke, which sends a damaging shockwave through the rod system), high stress or fatigue load limits in the rod system (e.g., the polish and sucker rods), and/or high torque in the gearbox.

In some embodiments, the controller 128 determines an appropriate motor speed profile in response to feedback received during a previous stroke cycle of the pump 110 from one or more sensors distributed across the pumpjack 100. In this example, the pumpjack 100 includes a load cell sensor 130, a crank rotation sensor 132, and a motor shaft position sensor 134 (each of which is depicted schematically in FIG. 1). The load cell sensor 130 (e.g., a strain gauge) provides a feedback signal proportional to the load carried by the polish rod 108. The crank rotation sensor 132 provides a feedback signal corresponding to the angular position of the crank 123 coupling the gearbox 120 to the piloting shaft 122. In some embodiments, the crank rotation sensor 132 includes a traveling magnet attached to the counterweight 124 carried by the crank 123 and a stationary transducer mounted to the gearbox 120 or the base 112. The transducer is responsive to the lines of magnetic flux effected by the traveling magnet, so that a signal is generated at each full 360° rotation of the counterweight 124.

Figure 2:
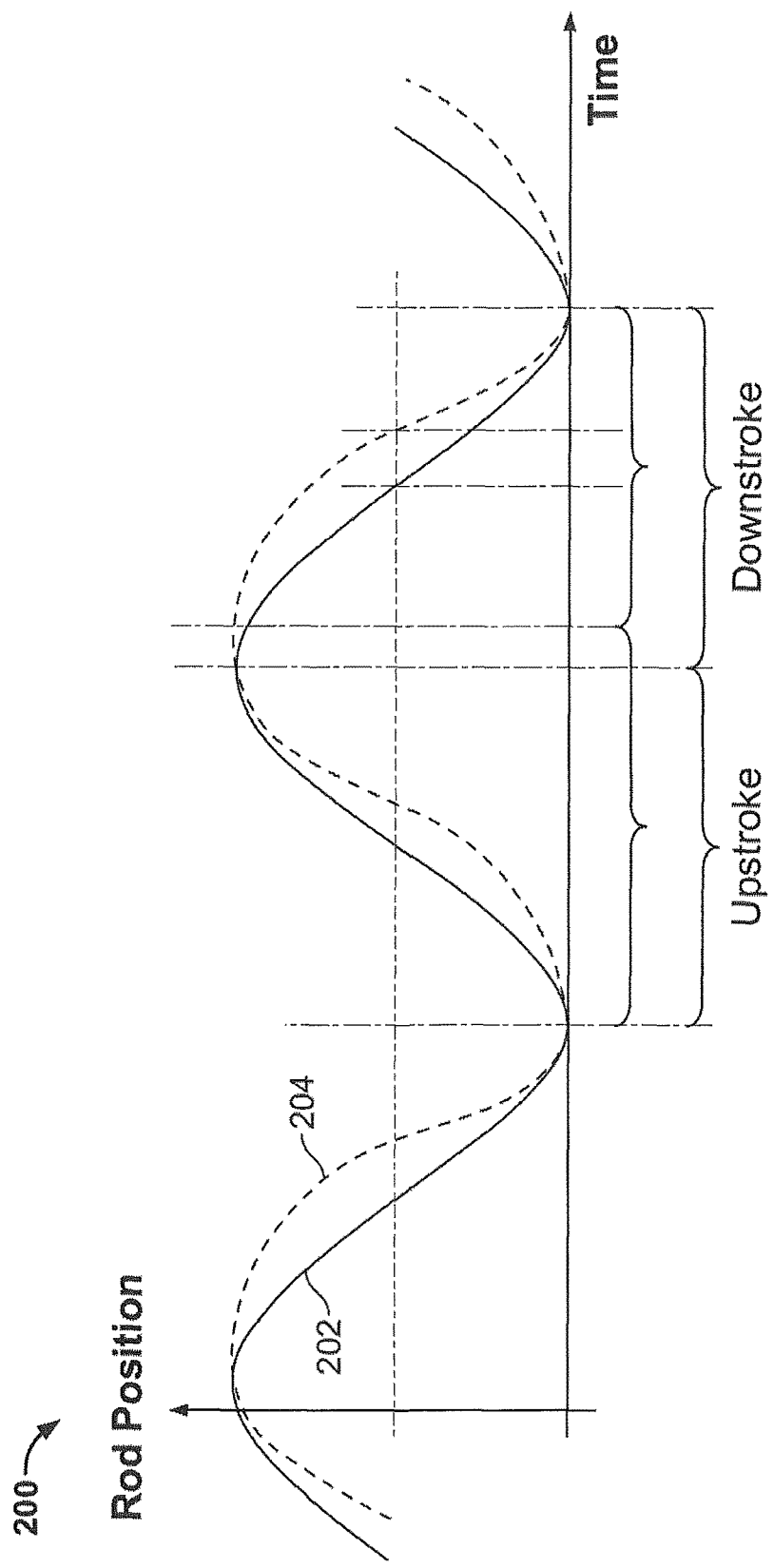
FIG. 2 is a graph illustrating a default stroke cycle compared to an adjusted stroke cycle.

FIG. 2 illustrates a graph 200 plotting polish rod position versus time illustrates a default stroke timing curve 202 and an adjusted stroke timing curve 204. The polish rod position data may be captured directly by a polish rod displacement sensor, or calculated based on feedback from the motor shaft position sensor 134 for the given geometry of the gearbox 120, crank 123 and other pumpjack components. The default stroke timing curve 202 is representative of a pumpjack where the prime mover is operated at constant speed. The default stroke timing curve 202 resembles a sinusoidal wave pattern, exhibiting a smooth repetitive oscillation between the upstroke and the downstroke, which are equal in duration. The adjusted stroke timing curve 204 is a modified version of the default stroke timing curve 202, and is representative of a pumpjack in accordance with one or more embodiments of the present disclosure, where the prime mover is controlled according to a motor speed profile including a plurality of varying target motor speeds within the stroke cycle. In this example, the adjusted stroke timing curve 204 demonstrates that that the prime mover is slowed down during the upstroke and sped up during the downstroke. As illustrated in the graph 200, the result, relative to the default stroke timing curve 202, is an increased upstroke time and a decreased downstroke time. The increased upstroke time increases the volumetric efficiency of the pump, because there is more time for the pump barrel to refill with fluid from the reservoir. Furthermore, slowing the prime mover, and therefore the pump plunger, during the upstroke may also increase the stroke length of the pump by allowing the elastic sucker rod to recover from stretching during the downstroke and potentially contract near the top of the upstroke. The amount of time added to the upstroke is compensated for by the decreased downstroke time.

As illustrated in the graph 200, the adjusted stroke timing curve 204 has the same duration as the default stroke timing curve 202. Thus, the adjusted stroke timing curve 204 provides an increase in pumping efficiency without affecting the overall "pumping rate" (by "pumping rate" we refer to the number of pump stroke cycles executed in a given time period e.g., strokes per minute (SPM)). The increase in pump efficiency and pump stroke length combined with a constant pumping rate results in an increased fluid production rate. The fluid production rate is typically measured in units of barrels of fluid per day (BFPD). In some embodiments, such as described below, the downstroke time may be even further decreased to increase the pumping rate relative to the default stroke timing curve and further increase the fluid production rate.

Referring next to FIG. 3, a sequential diagram 300 (illustrated graphically at FIGS. 9A-9C) demonstrates that a default motor speed profile 302 can be adapted by a motor speed adjustment table 304 to provide an adjusted motor speed profile 306. As described above, a motor speed profile includes a plurality of target motor speeds corresponding to each of a plurality of discrete control periods within a pump stroke cycle. In this example, the motor speed profiles include one-hundred control periods, each of which represents between about 5 and 100 milliseconds (e.g., between about 10 and 70 milliseconds, such as about 30 milliseconds or about 50 milliseconds) of the stroke cycle. However, other suitable configurations are also envisioned within the scope of the present disclosure (e.g., the number of control periods per cycle may be greater than or less than one-hundred, the number of control periods and/or the time duration of each control period may vary between cycles, etc.). The default motor speed profile 302 is representative of a pumpjack where the prime mover that is operated at constant speed of about 1,100 RPM. Thus, the target motor speed for each of the control periods of the default motor speed profile 302 is set to 1,100 RPM. In contrast to the default motor speed profile 302, the adjusted motor speed profile 306 includes a varying array of target motor speeds, ranging from 1,060 RPM to 1,170 RPM, distributed over the respective one-hundred control periods. The varying target motor speeds of the adjusted motor speed profile 306 are determined by modifying the default motor speed profile 302 according to the RPM adjustment values of the motor speed adjustment table 304. In this example, the RPM adjustment values are provided in the form of an array of increment (e.g., +0 to 70), decrement (e.g., −0 to −40) and null or zero (i.e., +0) values, each of which corresponds to a respective control period of the stroke cycle. Note that the target motor speeds and motor speed adjustment values discussed here with reference to the example of FIG. 3 are provided for illustrative purposes, and are not meant to limit the present disclosure. Various techniques within the scope of the present disclosure may produce significantly different results in this regard.

In some embodiments, the RPM adjustment values are determined according to a pumpjack optimization algorithm implemented by the controller 128. The pumpjack optimization algorithm may include a tuning mode and a monitoring mode. While operating in the tuning mode, the algorithm may determine one or more RPM adjustment values that will improve fluid production. While operating in the monitoring mode, the algorithm may determine one or more RPM adjustment values that will relieve one or more detrimental operating conditions (e.g., the onset of pump-off, high stress on the rod system, and/or high torque at the gearbox) detected based on sensory feedback.

As discussed above with reference to FIG. 2, the fluid production rate achieved by the pumpjack can be increased relative to a constant RPM prime mover by increasing the upstroke time, and decreasing the downstroke time. Thus, in some examples, the pumpjack optimization algorithm, while operating in the tuning mode, may derive a motor speed adjustment table 304 including RPM adjustment values that decrease one or more target motor speeds on the upstroke and increase one or more target motor speeds on the downstroke. In some examples, the pumpjack optimization algorithm may be designed to increase fluid production by increasing the pumping rate—i.e., reducing the duration of the total stroke cycle (upstroke plus downstroke) to achieve a higher SPM level. Thus, in some examples, the algorithm may derive a motor speed adjustment table 304 including RPM adjustment values that increase the target motor speeds on both the upstroke and the downstroke to increase the number of SPM. In such examples, any loss of pump efficiency and/or pump stroke length from decreasing the upstroke time is more than overcome by the increased pumping rate, the net result of which is an increased the fluid production rate.

In some embodiments, one or more of the RPM adjustment values is determined based on sensory feedback, such as may be received by the controller 128 from the load cell sensor 130, the crank rotation sensor 132, and/or the motor shaft position sensor 134 can be used to determine suitable RPM adjustment values. As noted above, the feedback from the crank rotation sensor 132 and the motor shaft position sensor 134 can be used to determine the position of the polish rod 108, and feedback from the load cell sensor 130 is proportional to the load carried by the polish rod 108. This position and load data can be used to construct a synthetic surface dynamometer card (e.g., using techniques described in U.S. Pat. No. 4,490,094) representative of loading at the polish rod 108 during a stroke cycle. The surface dynamometer card can then be transformed using techniques known to those of skill in the art (such as described in U.S. Pat. No. 3,343,409) into a downhole pump card representative of loading at the pump 110 during a stroke cycle. The surface dynamometer card and the downhole pump card can be used to detect or predict the conditions that are detrimental to pumpjack fluid production, such as the onset of pump-off, high stress on the rod system, and high torque at the gearbox. Thus, in some examples, the pumpjack optimization algorithm may conduct this type of analysis and appropriately respond by deriving an appropriate motor speed adjustment table 304 to relieve the detrimental condition by: (1) implementing a limited increment amount of one or more RPM adjustment values; (2) implementing one or more null or zero RPM adjustment values; and/or (3) implementing a decrement for one or more RPM adjustment values.

Figure 4:
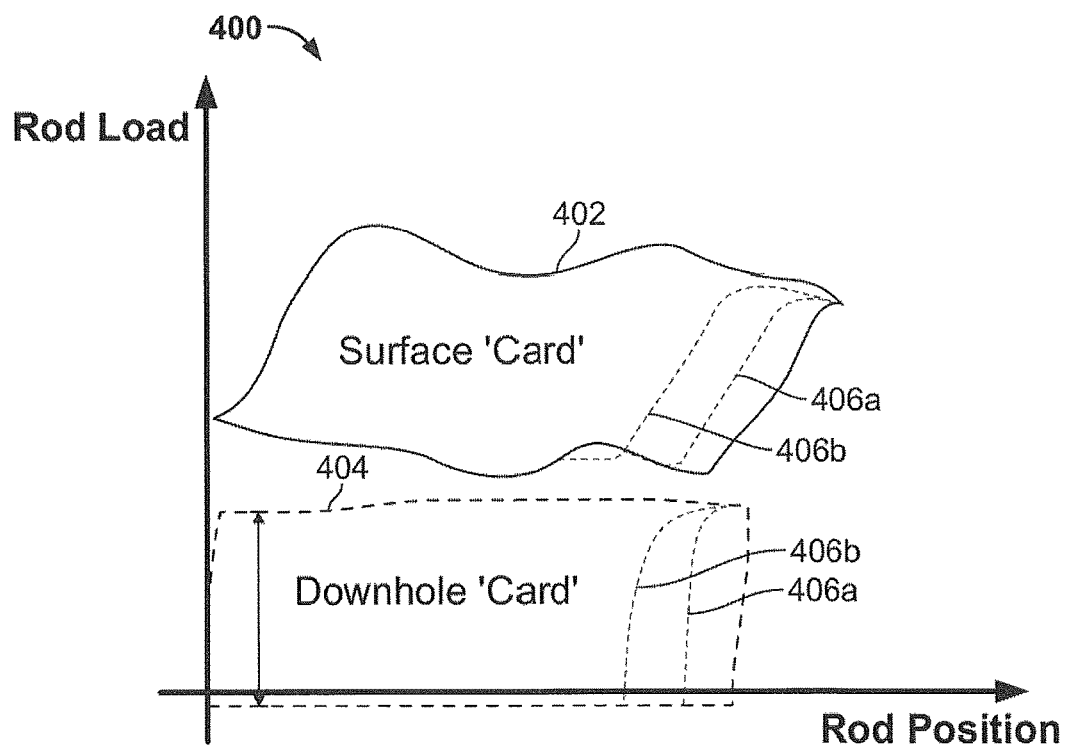
FIG. 4 is a graph illustrating a technique of operating a pumpjack that includes monitoring a surface dynamometer card and a downhole pump card to detect a pump-off condition.

The graph 400 of FIG. 4 demonstrates how a surface dynamometer card 402 and/or a downhole pump card 404 can be used to detect the onset of a pump-off during a pump stroke cycle. As shown, each of the cards 402 and 404 reflects a noticeable inward curvature 406a, 406b (sometimes referred to as a "compression curve") when a significant amount of gas is compressed during the upstroke. The detection of gas compression in the downstroke means that the pump barrel is not completely filling with fluid during the upstroke. A slight compression curve (406a) may suggest that pump-off is imminent, and a severe compression curve (406b) may suggest that pump-off is presently occurring. Pump-off generally occurs when the upstroke timing is too fast, preventing the pump barrel from refilling to an acceptable level and causing the plunger to pound into the fluid column on the downstroke. Pump-off may be relieved by implementing a decrement for one or more RPM adjustment values during the upstroke to slow down the prime-mover RPM and increase the upstroke time. One or more increment RPM adjustment values may be used on the downstroke to compensate for the increase in upstroke time.

Figure 5:
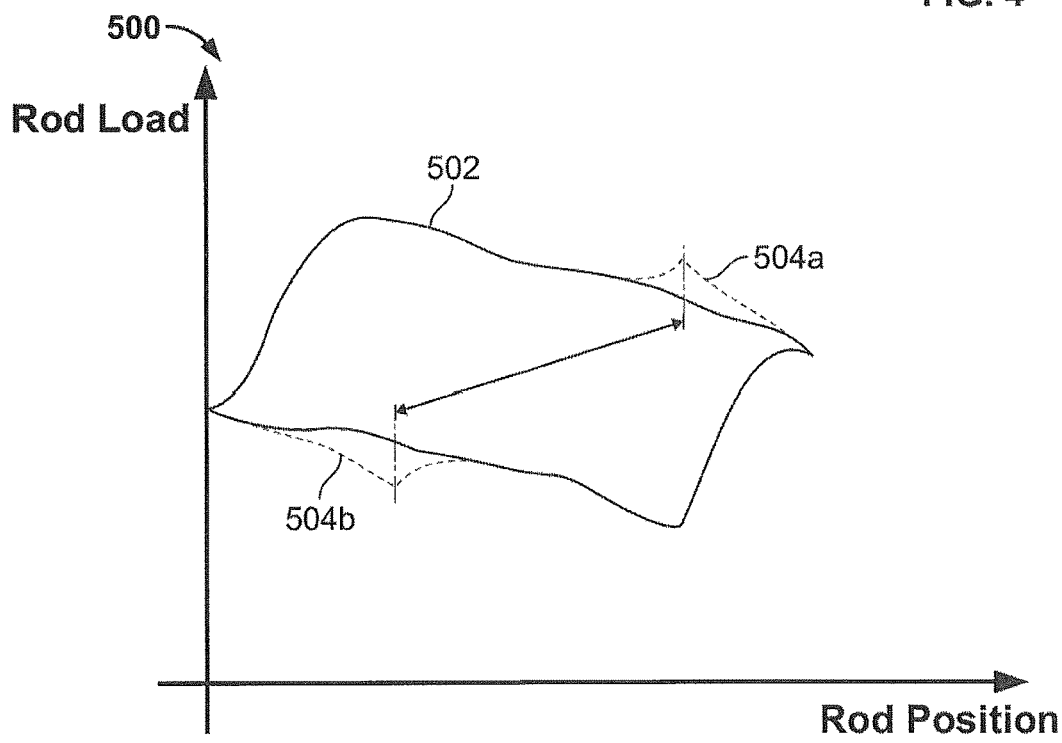
FIG. 5 is a graph illustrating a technique of operating a pumpjack that includes monitoring a surface dynamometer card to detect a rod binding.

The graph 500 of FIG. 5 demonstrates how a surface dynamometer card 502 can be used to detect a "binding" (e.g., a point at which the sucker rod is encountering interference from pipe or casing joints within the wellbore) in the rod system during a pump stroke cycle. A binding of the rod system may be exhibited on the surface dynamometer card 502 as a sharp increase in rod load 504a along the upstroke and a sharp decrease in rod load 504b along the downstroke of the stroke cycle. Similar to a fluid pounding event experienced during a pump-off condition, a rod binding may cause damage to the rod system over time. In some examples, a rod binding may be relieved by appropriately adjusting the stroke timing of the pumpjack. For example, one or more RPM adjustment values may be determined to slow down the sucker rod speed or lower its acceleration at or near the point within the wellbore where the binding has occurred. Such modifications to the stroke timing may be implemented immediately during the stroke cycle following detection or progressively over a serious of subsequent stroke cycles.

Figure 6:
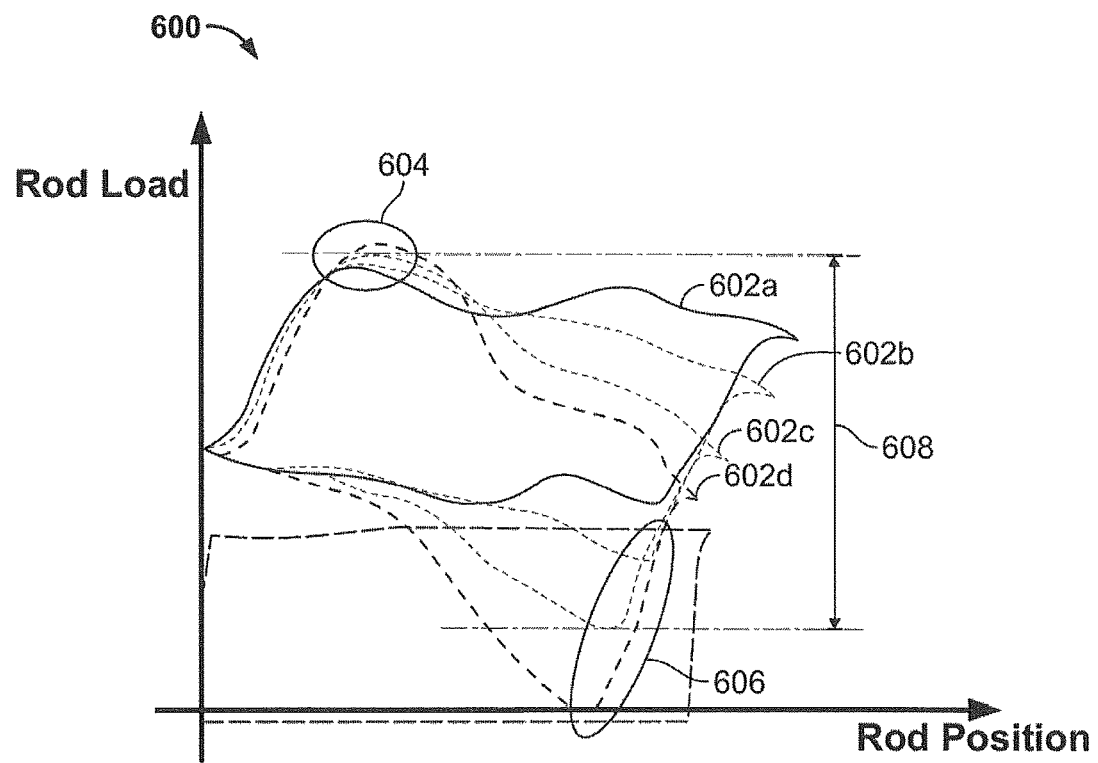
FIG. 6 is a graph illustrating a technique of operating a pumpjack that includes monitoring a surface dynamometer card to detect a rod stress limit.

The graph 600 of FIG. 6 demonstrates how a surface dynamometer card 602a-d can be used to detect that the sucker rod is being subjected to loads approaching one or more predetermined load and/or stress limits during a pump stroke cycle. Interpretation of the surface dynamometer card 602a-d for rod loading may include identification of the peak maximum rod load 604, the peak minimum rod load 606, and the difference 608 between these values. The peak maximum rod load 604 is observed near the beginning of the upstroke. The peak maximum rod load 604 can be compared to a predetermined maximum allowable rod load to identify an existing or imminent overloading event (see card 602d) that may cause the rod system to experience tensile failure (e.g., fracturing). The peak minimum rod load 606 is observed near the beginning of the downstroke. The peak minimum rod load 608 may be monitored with respect to the zero load level, at which point the rod system is essentially in freefall (see card 602d), and therefore susceptible to buckling. The difference 608 between the peak maximum rod load 604 and the peak minimum rod load 606 is proportional to the rod fatigue stress. Fatigue failures are progressive and begin as small stress cracks that grow under the action of cyclic stresses. Thus, the rod fatigue stress can also be monitored with respect to a predetermined limit value. Overloading and freefall can be relieved by implementing a decrement for one or more RPM adjustment values during the upstroke and/or the downstroke.

Figure 7:
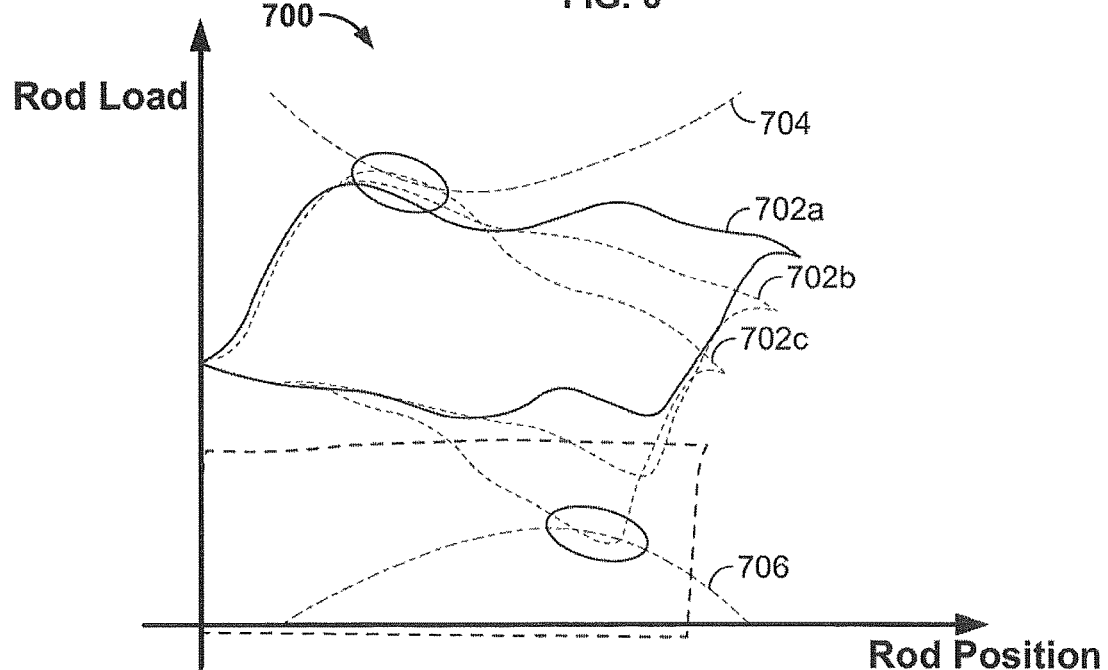
FIG. 7 is a graph illustrating a technique of operating a pumpjack that includes monitoring a surface dynamometer card to detect a gearbox torque limit.

The graph 700 of FIG. 7 demonstrates how a surface dynamometer card 702a-c can be used to detect that the gearbox is being subjected to loads approaching one or more predetermined torque limits during a pump stroke cycle. Interpretation of the surface dynamometer card 702a-c for gearbox torque may include monitoring the rod load with respect to an upstroke torque limit curve 704 and a downstroke torque limit curve 706. The torque limit curves 704 and 706 represent the rod loads plotted as a function of rod position that causes the net torque at the gearbox (which may be considered as the torque caused by the well loads acting on the polish rod discounted by the torque caused by the counterweight acting on the crank) to exceed a predetermined maximum limit. Overtorquing the gearbox can be relieved by implementing a decrement for one or more RPM adjustment values during the upstroke and/or the downstroke.

Figure 8:
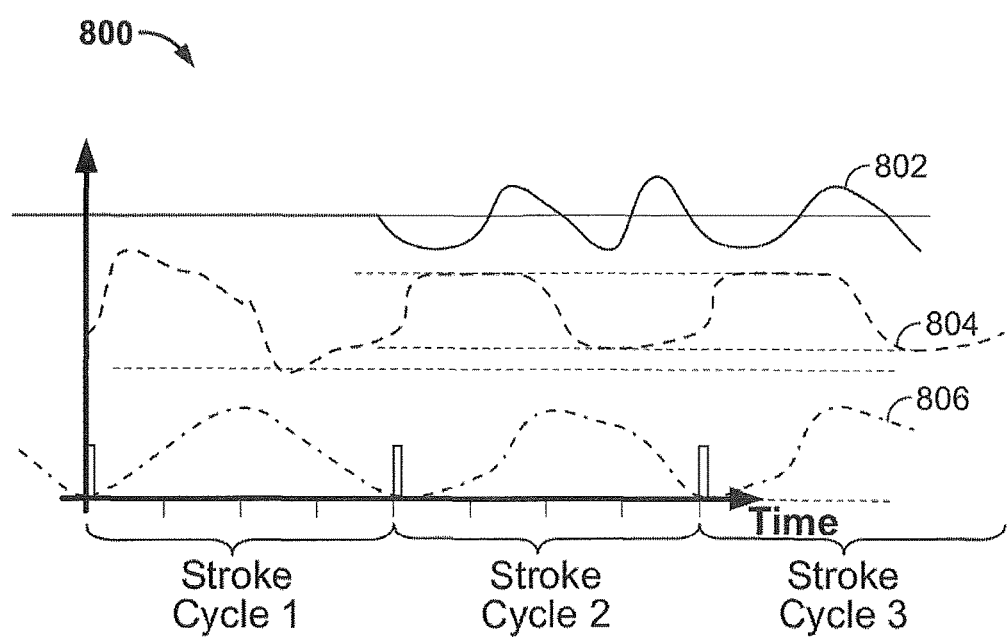
FIG. 8 is a graph illustrating the progressive modification of a pumpjack stroke cycle in response to varying motor speeds.

In some embodiments, the tuning mode and/or the monitoring mode of the pumpjack optimization algorithm may include an iterative process for progressively improving pumpjack performance. In some examples, the iterative process may proceed continuously over a sequence of two or more adjacent pump stroke cycles. So, one or more of the above-described techniques may be repeated through multiple iterations to gradually increase fluid production. FIG. 8 illustrates a graph 800 including a motor RPM curve 802, a rod load curve 804, and a stroke timing curve 806, which demonstrates an interactive tuning process such as may be implemented by the pumpjack optimization algorithm. In particular, the graph 800 is illustrative of how the operations of a pumpjack can be progressively tuned through successive adjustments of the motor speed profile applied to the prime mover. In Stroke Cycle 1, the prime mover is operated according to a default motor speed profile having constant speed. In Stroke Cycle 2, the motor speed profile is adjusted to increase and decrease motor RPM at specific points of the upstroke and downstroke. The RPM adjustments applied during Stroke Cycle 2 may be derived at least partially based on sensory feedback received during Stroke Cycle 1. In Stroke Cycle 3, the motor speed profile is modified yet again based at least in part on sensory feedback received during the previous stroke cycles. As discussed above, sensory feedback can be used to detect or predict detrimental operating conditions that may be relieved or inhibited by appropriate RPM adjustments in the subsequent motor speed profile. However, sensory feedback may also be used facilitate the derivation of RPM adjustment values that are likely to increase fluid production. For example, the surface dynamometer card and the downhole pump card can be monitored during the tuning process to identify specific control periods within the motor speed profile where an appropriate RPM adjustment (e.g., a decrement or increment) is likely to result in increased pump efficiency and/or increased pump stroke length. In some embodiments, the RPM adjustments may be determined based on historical data from previous operations of the current pumpjack or a similarly designed pumpjack. Such historical data may outline the general profile of a previously identified high-production and stable motor speed profile. Thus, the pumpjack optimization algorithm may initially implement suitable RPM adjustments to approach the historical motor speed profile. Deviations from the historical motor speed profile may occur over time based on current sensory feedback.

In some embodiments, iterative tuning of the pumpjack may take place over several stroke cycles. In some examples, RPM adjustments to the motor speed profile may be conducted in successive cycles of the tuning process, such as shown in the graph 800 of FIG. 8. Such RPM adjustments may be relatively small (e.g., within the range of +10 RPM and −10 RPM) in some cases, so as to maintain system stability and prevent damage from unforeseen detrimental operating conditions. In some examples, RPM adjustments to the motor speed profile may be conducted piecemeal, with one or more intervening stroke cycles occurring therebetween. For example, RPM adjustments to increase fluid production may be implemented according to predetermined intervals (e.g., every 10 stroke cycles). The intervening stroke cycles can be monitored to detect the onset of any potential adverse operating conditions. In any event, the controller 128 may cease the iterative tuning process when it is determined that the motor speed profile has been optimized. For example, the controller 128 may determine that the motor speed profile has been optimized when subsequent adjustments no longer provide significant improvements in fluid production and/or when subsequent adjustments cannot be implemented without introducing an adverse operating condition (e.g., when further incrementing RPM adjustments will result in overtorquing of the gearbox).

The graphs of FIGS. 9A-9E provide yet another illustration of an iterative tuning process that may take place over multiple cycles of a pumpjack. In this example, the tuning process may be conducted according to the technique described above with reference to FIG. 3, where a motor speed profile can be adjusted based on a motor speed adjustment table. Accordingly, the graph 900a illustrates a default motor speed curve 902 where the target motor speed for each control period of the cycle is set to a constant speed of 1,100 RPM. The graph 900b illustrates a first motor speed adjustment curve 904 representative of a varying array of increment (e.g., +0 to 70), decrement (e.g., −0 to −40) and null (i.e., +0) values, each of which corresponds to a respective control period of the cycle. The graph 900c illustrates a first adjusted motor speed curve 906 overlaying the default motor speed curve 902. As shown, the first adjusted motor speed curve 906 represents a varying array of target motor speeds, ranging from 1,060 RPM to 1,170 RPM, distributed over the respective the control periods of the cycle. As discussed above, the first adjusted motor speed curve 906 is provided by applying the increment, decrement, and null values of the first motor speed adjustment curve 904 to the default motor speed curve 902. Thus, the first adjusted motor speed curve 906 features one or more target motor speeds greater than the default 1,100 RPM and one or more target speeds less than the default. The graph 900d illustrates a second motor speed adjustment curve 908 having increment and decrement values that range between +25 RPM and −20 RPM. And the graph 900e illustrates a second adjusted motor speed curve 910 representing a varying array of target motor speeds ranging from 1,065 RPM to 1,191 RPM. The second adjusted motor speed curve 910 is provided by applying the respective adjustment values from the second motor speed adjustment curve 908 to the first adjusted motor speed curve 906. Thus, the second adjusted motor speed curve 910 is a second order iteration of the default motor speed curve 902.

This iterative tuning process, while demonstrated across two pump stroke cycles in this example, may be repeated any number of times to achieve an optimized motor speed profile. As noted above, such adjustments of the motor speed profile may be conducted across successive cycles or between one or more intervening cycles. The first and second motor speed adjustment curves 902 and 908 may be derived according to any suitable algorithm for improving fluid production, such as those described above involving increased pump efficiency, increased pumping rate, as well as preventing, relieving or mitigating detrimental operating conditions using sensory feedback. Furthermore, a similar process may be performed to adjust the motor speed profile during a monitoring mode. For example, the controller may detect one or more detrimental operating conditions based on sensory feedback and derive an appropriate motor speed adjustment curve to relieve the condition. In some embodiments, after a detrimental condition detected during the monitoring mode has been relieved, the pumpjack controller may re-enter the tuning mode in an attempt to improve fluid production.

FIGS. 10-12 and 14 illustrate processes 1000, 1100, 1200 and 1400 for operating a pumpjack. These processes can be implemented, for example, in connection with one or more components of the pumpjack 100, particularly the controller 128 and/or the VFD 126. Further, the operations of the processes do not require the any particular order to achieve desirable results. In addition, other operations may be provided, or operations may be eliminated, from the described processes without departing from the scope of the present disclosure.

Figure 10:
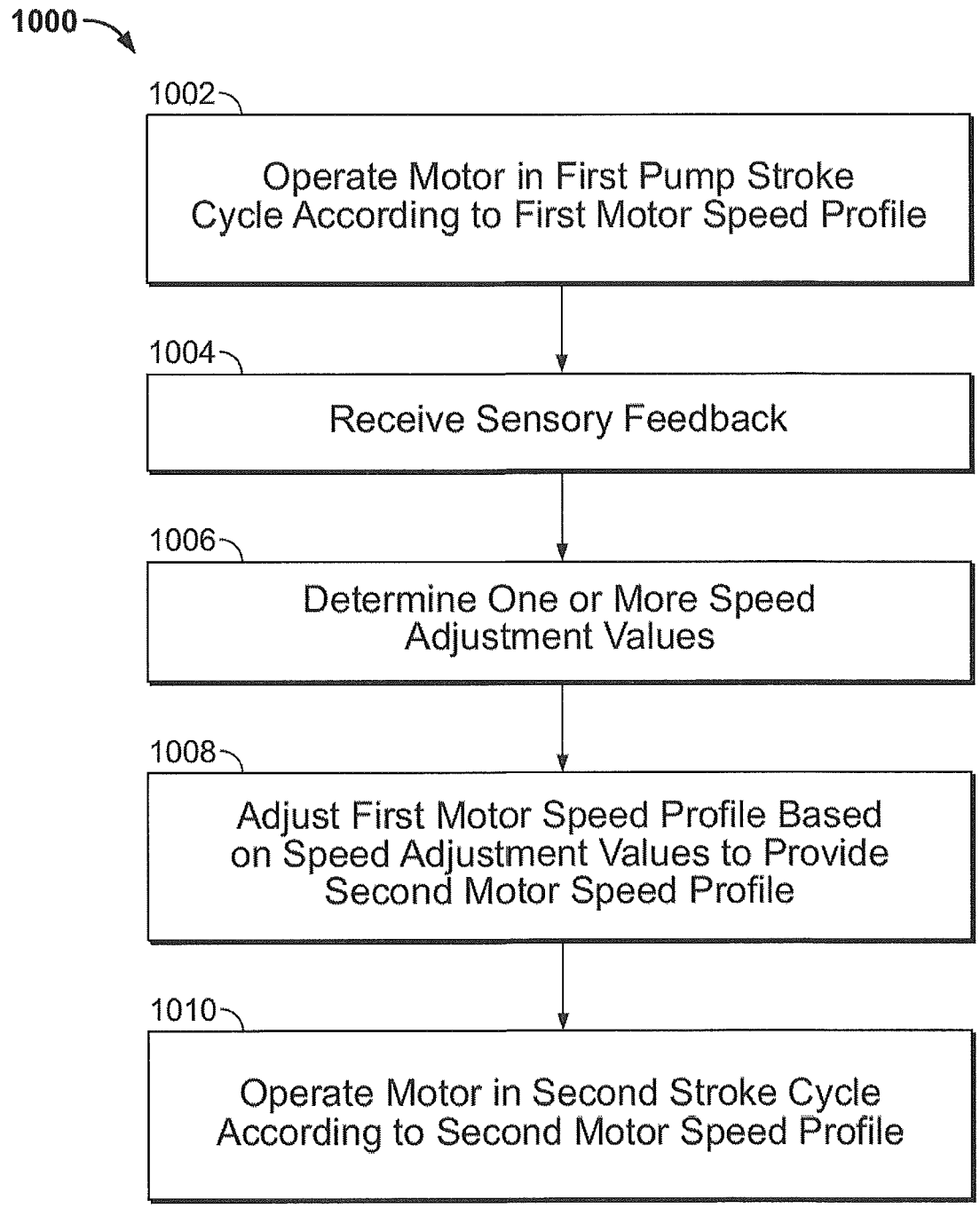
FIG. 10 is a flow chart illustrating a first method of operating a pumpjack in accordance with one or more embodiments of the present disclosure.

According to the process 1000 of FIG. 10, an electric motor driving the pumpjack is operated (1002) in a first pump stroke cycle according to a first motor speed profile. The first motor speed profile includes a plurality of target motor speeds, each of which corresponds to a respective discrete control period within the first pump stroke cycle. In some embodiments, the first motor speed profile may be a predetermined default setting (e.g., a constant RPM pattern), or an altered version of a motor speed profile utilized in a previous pump stroke cycle. Sensory feedback is received (1004) during the first pump cycle from one or more sensors mounted to monitor the operations of the pumpjack. The sensory feedback includes data collected during operation of the motor according to the first motor speed profile. In some embodiments, the sensory feedback may be received from one or more of a load cell sensor, a crank rotation sensor, and a motor shaft position sensor. One or more speed adjustment values corresponding to a limited subset of the plurality of control periods are determined (1006) in response to receiving the sensory feedback, and while continuing to operate the pumpjack. In some embodiments, the speed adjustment values may be determined by constructing a data structure relating position to load with respect to the rod system of the pumpjack (e.g., a surface dynamometer card and/or a downhole pump card), and comparing the data structure to one or more predetermined load limits (e.g., a maximum rod load, a minimum rod load, an upstroke torque load limit, and a downstroke torque load limit) to identify an adverse operating condition (e.g., the onset of pump-off, high stress on the rod system, and high torque at the gearbox). In some embodiments, the speed adjustment values may be determined by identifying an abrupt load spike indicative of a rod binding. In some embodiments, the speed adjustment values may include a decrement to decrease the target motor speed at a control period where an adverse operating condition is likely to reoccur, or at an earlier control period. Decreasing motor speed at or before the control period where the adverse operating condition is likely to reoccur may relieve the condition. In some embodiments, the speed adjustment values may include an increment to increase the target motor speed at a control period where an adverse operating condition is not likely to reoccur. Increasing motor speed at a different point in the stroke cycle may increase the pumping rate, without aggravating or re-initiating the adverse operating condition. The first motor speed profile is adjusted (1008) based on the one or more speed adjustment values to provide a second motor speed profile. And the electric motor is operated (1010) over a second pump stroke cycle, which is immediately subsequent to the first pump stroke cycle, in accordance with the second motor speed profile.

Figure 11:
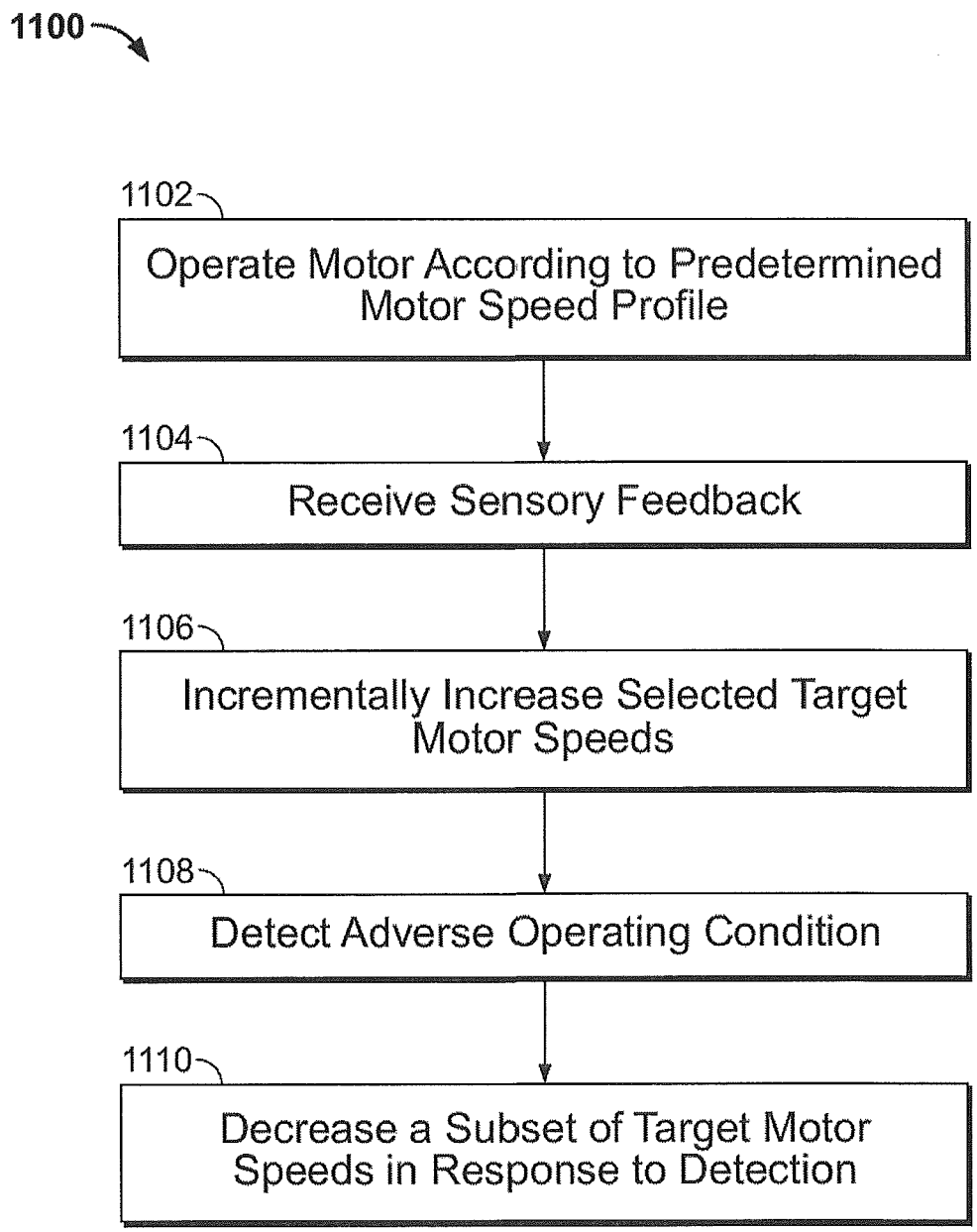
FIG. 11 is a flow chart illustrating a second method of operating a pumpjack in accordance with one or more embodiments of the present disclosure.

According to the process 1100 or FIG. 11, an electric motor driving the pumpjack is operated (1102) according to a predetermined motor speed profile. The motor speed profile includes a plurality of target motor speeds, each of which corresponds to a respective control period within a stroke cycle of the pumpjack. Sensory feedback is received (1104) as the motor is operated during the stroke cycle from one or more sensors mounted to monitor the operations of the pumpjack (e.g., a load cell sensor, a crank rotation sensor, and/or a motor shaft position sensor). While continuing to operate (1102) the electric motor and receive (1104) sensory feedback, selected target motor speeds are incrementally increased (1106) over a plurality of sequential stroke cycles until an adverse operating condition (e.g., the onset of pump-off, high stress on the rod system, and high torque at the gearbox) is detected (1108) based on the sensory feedback. In response to detecting (1108) the adverse operating condition, a select subset of the plurality of target motor speeds are decreased (1110) based on a position of the detected adverse operating condition within the stroke cycle. In some embodiments, the select subset of the plurality of target motor speeds may include one or more target motor speeds at or before the control where the adverse operating condition is likely to reoccur.

Figure 12:
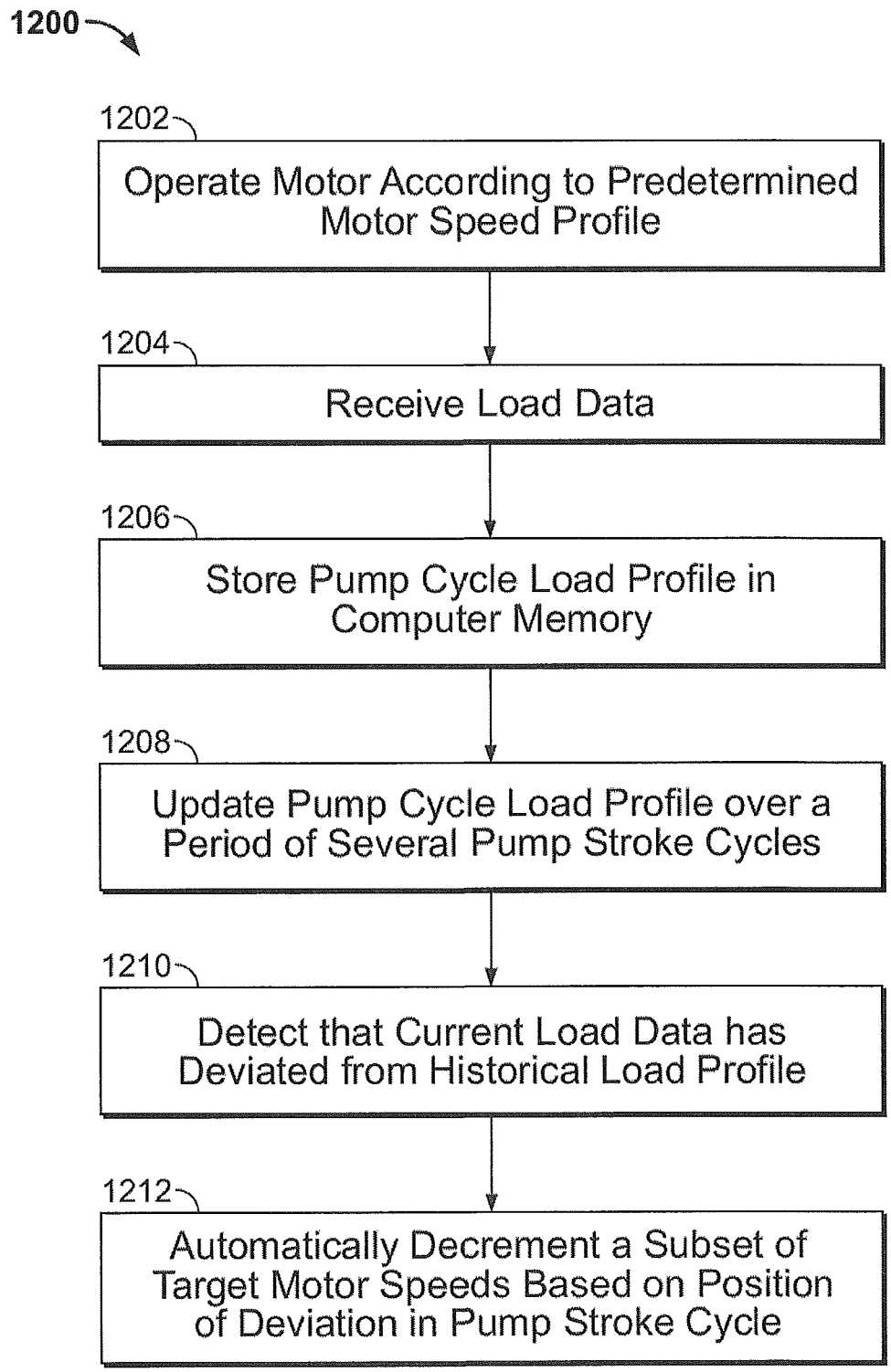
FIG. 12 is a flow chart illustrating a third method of operating a pumpjack in accordance with one or more embodiments of the present disclosure.

According to the process 1200 of FIG. 12, an electric motor driving the pumpjack is operated (1202) according to a predetermined motor speed profile. The motor speed profile includes a plurality of target motor speeds corresponding to each of a plurality of discrete pump stroke cycle segments (e.g., discrete control periods). Load data is received (1204) from one or more sensors (e.g., a load cell sensor) mounted to monitor operations of the pumpjack. A pump cycle load profile is stored (1206) in computer memory and updated (1208) over a period of several pump stroke cycles based on the received load data. And, in response to detecting (1210) that current load data has deviated from the historical load profile by more than a predetermined deviation threshold, a subset of the plurality of the target motor speeds are automatically decremented (1212). The target motor speeds to be decremented are selected based on the position of the deviating load data within the stroke cycle. The detected load data deviation may be indicative of an adverse operating conditions such as a rod binding, pump-off, high stress on the rod system, and high torque at the gearbox.

Figure 13:
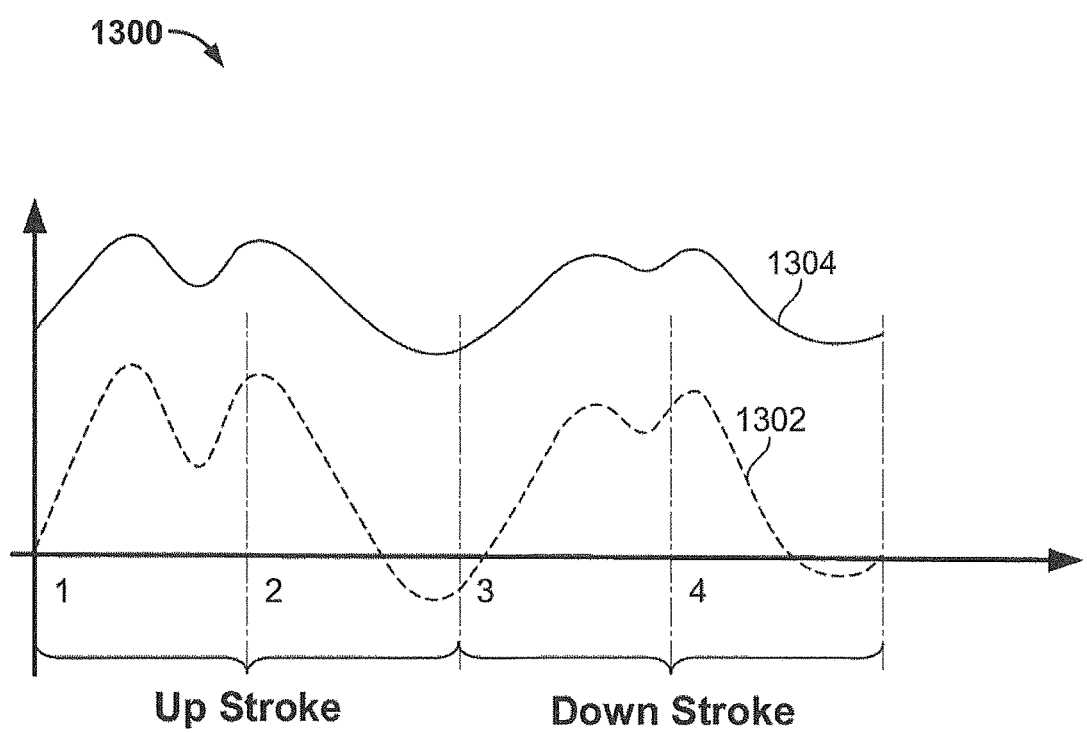
FIG. 13 is a graph illustrating a varying voltage profile determined based on a varying motor torque profile.

As described in detail above, the prime mover of a pumpjack may be operated according to varying motor speed profile to improve fluid production and prevent or inhibit certain adverse operating conditions. The motor speed profile includes a plurality of target motor speeds corresponding to each of a plurality of discrete control periods within the stroke cycle. The VFD regulates the speed and torque output of the pumpjack motor by varying input frequency and voltage. In some embodiments, a controller coupled to the VFD can be configured (e.g., appropriately programmed) to implement a dynamic torque control technique where the torque of the motor is adapted to meet, but not exceed (at least beyond a predetermined safety margin), the load requirements for operation at the prescribed motor speed for each control period of the current stroke cycle. The voltage applied creates the potential for torque within the motor. Thus, the applied voltage may be reduced according to a reduction in torque required by the motor. In some examples, the voltage required may be accurately predicted and regulated based upon historical pump cycle data, allowing for prevention of stall conditions (i.e., where the motor is starved of torque) and optimization of the efficiency of the motor by applying only the voltage required to deliver that torque. Accordingly, decreased energy consumption may be achieved by using dynamic torque control. The graph 1300 of FIG. 13 illustrates a dynamic motor torque curve 1302 and a motor voltage curve 1304 applied to provide the required torque at each point in the stroke cycle.

Figure 14:
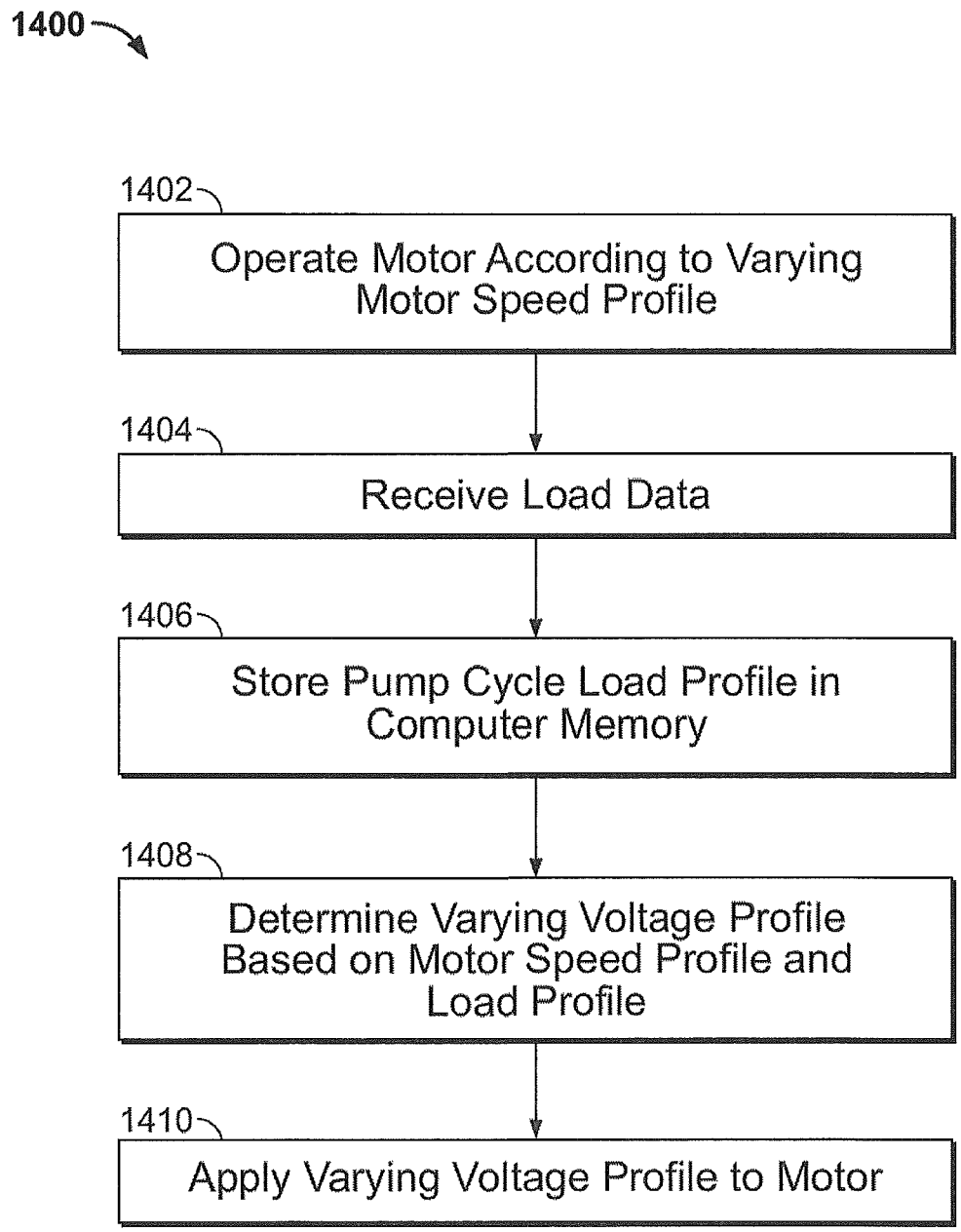
FIG. 14 is a flow chart illustrating a fourth method of operating a pumpjack in accordance with one or more embodiments of the present disclosure.

According to the process 1400 of FIG. 14, an electric motor driving the pumpjack is operated (1402) according to a varying motor speed profile. The motor speed profile includes a plurality of target motor speeds corresponding to each of a plurality of discrete pump stroke cycle segments (e.g., discrete control periods). Load data is received (1404) from one or more sensors (e.g., a load cell sensor) mounted to monitor operations of the pumpjack. A pump cycle load profile is stored (1406) in computer memory based on the received load data. A varying voltage profile is automatically determined (1408) to drive the electric motor according to the plurality of target motor speeds and the pump cycle load profile. And the varying voltage profile is subsequently applied (1410) to the motor. Further, in some embodiments, a dynamic torque control technique may be conducted predictively on a cycle-by-cycle bases. That is, the pump cycle load profile (e.g., the dynamic motor torque curve) can be mathematically predicted based on an altered motor speed profile to be implemented during the upcoming pump stroke cycle. The predicted pump cycle load profile can then be used to determine a predicted varying voltage profile. The altered motor speed profile and the predicted varying voltage profile can be simultaneously implemented during the next pump stroke cycle. This predictive technique would normally be dangerous to implement in a highly variable torque environment, because a large increase in the torque requirement on the motor cannot be predicted by a conventional control system. However, in one or more embodiments of the present disclosure, the pump cycle load profile can be accurately determined (e.g., mathematically predicted) based at least in part on historical sensory feedback data and/or adjustments between the current motor speed profile and one or more stroke timing curves implemented during one or more previous cycles.

Figure 15:
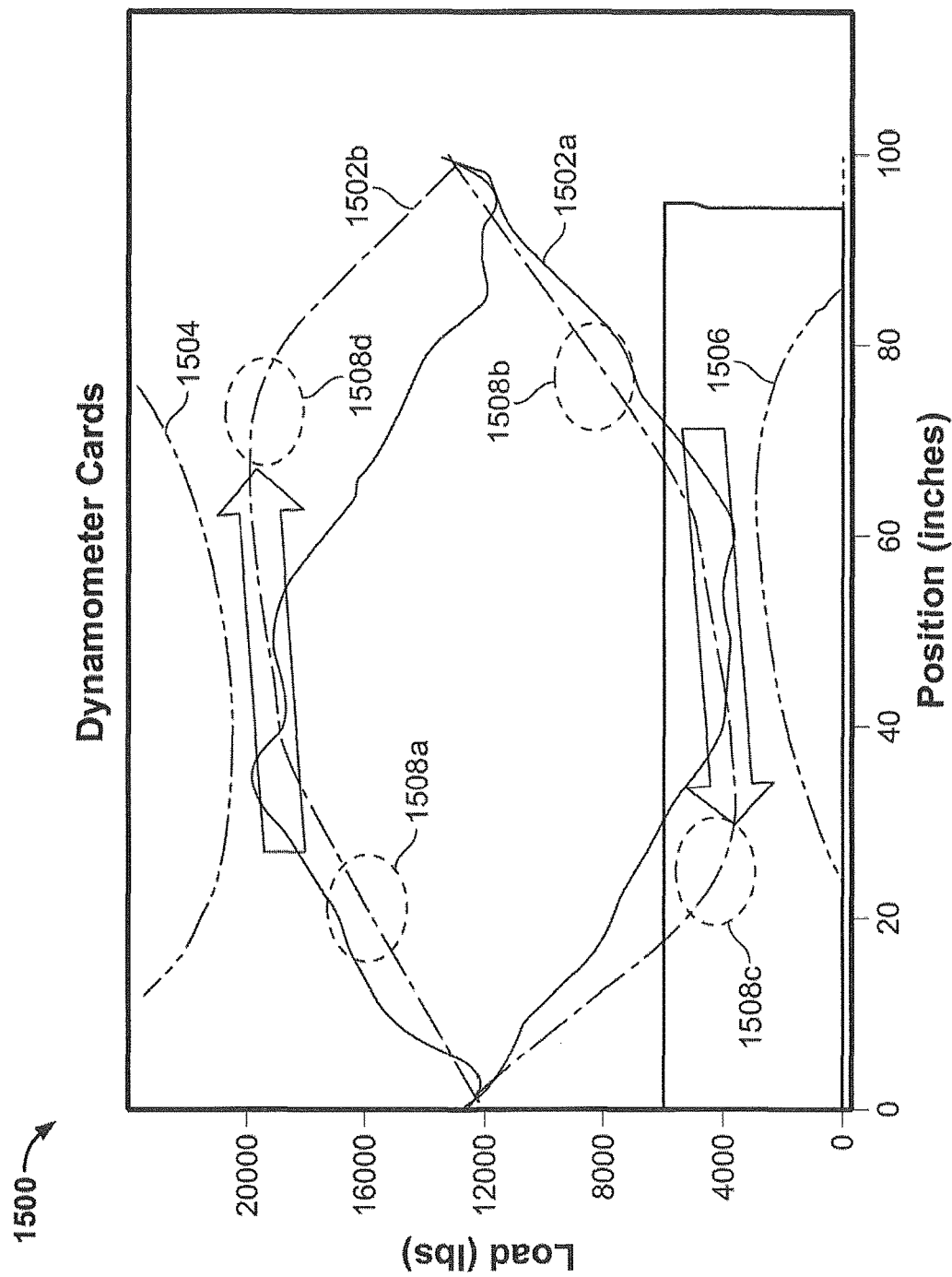
FIG. 15 is a graph illustrating a technique of operating a pumpjack that includes monitoring a surface dynamometer card and altering the stroke timing of the motor to increase fluid production while avoiding gearbox torque limits.

The graph 1500 of FIG. 15 demonstrates how a surface dynamometer card 1502a can be adjusted over one or more pump stroke cycles to increase fluid production while avoiding the predetermined gearbox torque limits 1504 and 1506. As discussed above with reference to FIG. 7, overtorquing the gearbox can be prevented or relieved by implementing a decrement for one or more RPM adjustment values during the upstroke and/or the downstroke. However, decreasing the motor RPM to remedy or prevent damage to the gearbox can have a detrimental effect on the fluid production rate. Thus, in order to maintain (or even increase) the rate of fluid production, one or more increments RPM adjustment values may be implemented at other regions of the stroke cycle that are not structurally limited by the torque limits. The surface dynamometer card 1502*b* illustrates two regions of the stroke cycle 1508*a*, 1508*b* where the motor RPM is decreased to avoid the torque limits, and two other regions 1508*c*, 1508*d* where the motor RPM is increased to make up for the motor speed decrease. In this way, the stroke cycle can be further optimized via a strategically alteration of the surface dynamometer card to effectively redistribute the gearbox torque. Similar techniques for altering the surface dynamometer card can be implemented with respect to the peak maximum and peak minimum rod loads described above with reference to FIG. 6 and/or the detection of a rod binding described above with reference to FIG. 5, with the effect of preventing or curing a rod stress condition while increasing fluid production.

A number of embodiments of the invention have been described. Nevertheless, it will be understood that various modifications may be made without departing from the spirit and scope of the inventions.

What is claimed is:

1. A method of operating a pumpjack continuously over a sequence of two adjacent pump stroke cycles, the method comprising:
    energizing an electric motor to operate the pumpjack over a first of the two pump stroke cycles, according to a first motor speed profile having a predetermined default setting and comprising a plurality of target motor speeds corresponding to each of a plurality of discrete control periods within the first pump stroke cycle;
    receiving sensory feedback during the first pump stroke cycle from
    one or more sensors mounted to monitor at least one operating condition of the pumpjack, the sensory feedback comprising data collected during operation of the motor according to the first motor speed profile;
    in response to receiving the sensory feedback, and while continuing to operate the pumpjack, determining one or more speed adjustment values corresponding to a limited subset of the plurality of discrete control periods;
    altering the first motor speed profile based on the one or more adjustment values to provide a second motor speed profile; and
    operating the electric motor over the second of the two pump stroke cycles, according to the second motor speed profile.

2. The method of claim 1, wherein the first motor speed profile comprises an altered version of a motor speed profile utilized in a previous pump stroke cycle of the sequence.

3. The method of claim 1, wherein the plurality of discrete control periods of the first pump stroke cycle comprise 100 control periods.

4. The method of claim 1, wherein one or more of the plurality of discrete control periods of the first pump stroke cycle comprise a time duration of between about 5 and 100 milliseconds.

5. The method of claim 1, wherein each of the plurality of discrete control periods of the first pump stroke comprise an identical time duration.

6. The method of claim 1, wherein at least one of the sensors comprises a load sensor.

7. The method of claim 6, wherein the load sensor is responsive to load applied to a polish rod of the pumpjack.

8. The method of claim 1, wherein at least one of the sensors comprises a crank rotation sensor.

9. The method of claim 1, wherein at least one of the sensors comprises a motor shaft position sensor.

10. The method of claim 1, wherein at least one of the sensors comprises a motor current sensor.

11. The method of claim 1, wherein determining the one or more speed adjustment values comprises constructing a data structure relating position to load with respect to a polish rod of the pumpjack over the first pump stroke cycle based on the sensory feedback.

12. The method of claim 11, wherein determining the one or more speed adjustment values further comprises comparing the data structure to one or more predetermined load limits.

13. The method of claim 12, wherein at least one of the predetermined load limits corresponds to the structural integrity of the polish rod.

14. The method of claim 11, wherein at least one of the predetermined load limits corresponds to the structural integrity of a gear box coupled to the motor and the polish rod.

15. The method of claim 11, wherein determining the one or more speed adjustment values further comprises identifying an abrupt load spike based on the data structure.

16. The method of claim 11, wherein the data structure comprises a dynamometer surface card.

17. The method of claim 11, wherein the data structure comprises a downhole pump card.

18. The method of claim 1, wherein determining the one or more speed adjustment values comprises:
    detecting a detrimental operating condition within the first pump stroke cycle based on the sensory feedback; and
    selecting a speed adjustment value to increase the target motor speed at a control period within the second pump stroke cycle preceding or subsequent to a different control period where the detrimental operating condition is likely to reoccur.

19. The method of claim 1, wherein determining the one or more speed adjustment values comprises:
    detecting a detrimental operating condition within the first pump stroke cycle based on the sensory feedback; and
    selecting a speed adjustment value to decrease the target motor speed at a control period within the second pump stroke cycle where the detrimental operating condition is likely to reoccur.

20. The method of claim 1, wherein determining the one or more speed adjustment values comprises:
    detecting a detrimental operating condition within the first pump stroke cycle based on the sensory feedback; and
    selecting a speed adjustment value to decrease the target motor speed at a control period within the second pump stroke cycle preceding a different control period where the detrimental operating condition is likely to reoccur.

21. The method of claim 1, wherein the electric motor comprises a regenerative drive, and wherein the method further comprises providing a breaking torque to control the descent of a rod system of the pumpjack during a downstroke of each of the pump stroke cycles, while simultaneously converting kinetic energy of the rod system into electrical power.

22. A method of operating a pumpjack, the method comprising:
operating an electric motor of a pumpjack to pump fluid, according to a predetermined motor speed profile comprising a plurality of target motor speeds corresponding to each of a plurality of discrete control periods within a stroke cycle of the pumpjack, while receiving sensory feedback comprising data collected from one or more sensors mounted to monitor at least one operating condition of the pumpjack;
while continuing to operate the electric motor to pump fluid, incrementally increasing selected ones of the plurality of target motor speeds over a plurality of sequential stroke cycles until a detrimental operating condition is detected based on sensory feedback; and in response to detecting the detrimental operating condition, and as the pumpjack continues to pump fluid, decreasing a subset of the plurality of target motor speeds selected based on a position of the detected detrimental operating condition within the stroke cycle.

23. The method of claim 22, wherein the plurality of discrete control periods comprise control periods.

24. The method of claim 22, wherein one or more of the plurality of discrete control periods comprise a time duration of between about 5 and 100 milliseconds.

25. The method of claim 22, wherein each of the plurality of discrete control periods comprise an identical time duration.

26. The method of claim 22, wherein at least one of the sensors comprises a load sensor.

27. The method of claim 26, wherein the load sensor is responsive to load of a polish rod of the pumpjack.

28. The method of claim 22, wherein at least one of the sensors comprises a crank rotation sensor.

29. The method of claim 22, wherein at least one of the sensors comprises a motor shaft position sensor.

30. The method of claim 22, wherein at least one of the sensors comprises a motor current sensor.

31. The method of claim 22, wherein incrementally increasing selected ones of the plurality of target motor speeds comprises incrementally increasing each of the plurality of target motor speeds according to a predetermined adjustment schedule.

32. The method of claim 22, wherein the detrimental operating condition is detected by:
constructing a data structure relating position to load with respect to a polish rod of the pumpjack over the stroke cycle based on the sensory feedback; and
comparing the data structure to one or more predetermined load limits.

33. The method of claim 32, wherein at least one of the predetermined load limits corresponds to the structural integrity of the polish rod.

34. The method of claim 32, wherein at least one of the predetermined load limits corresponds to the structural integrity of a gear box coupled to the motor and the polish rod.

35. The method of claim 22, wherein the detrimental operating condition is detected by: constructing a data structure relating position to load with respect to a polish rod of the pumpjack over the stroke cycle based on the sensory feedback; and identifying an abrupt load spike based on the data structure.

36. The method of claim 22, wherein decreasing a subset of the plurality of target motor speeds comprises decreasing the target motor speed at one or more control periods preceding a different control period where the detrimental operating condition is likely to reoccur.

37. The method of claim 22, wherein decreasing a subset of the plurality of target motor speeds comprises decreasing the target motor speed at the control period where the detrimental operating condition is likely to reoccur.

38. The method of claim 22, wherein the electric motor comprises a regenerative drive, and wherein the method further comprises providing a breaking torque to control the descent of a rod system of the pumpjack during a downstroke of each of the pump stroke cycles, while simultaneously converting kinetic energy of the rod system into electrical power.

39. A pumpjack motor system, comprising:
an electric motor coupled to a gear box of a pumpjack;
one or more sensors mounted to monitor at least one operating condition of the pumpjack; and
a local controller coupled to the electric motor and the one or more sensors and operable, while the pumpjack continuously pumps fluid, to:
control the motor according to a first motor speed profile comprising a plurality of target motor speeds corresponding to each of a plurality of discrete control periods within a single stroke cycle of the pumpjack;
receive sensory feedback from the one or more sensors, the sensory feedback comprising data, including load data, collected during operation of the motor according to the first motor speed profile;
automatically increment a first set of the target motor speeds corresponding to portions of the stroke cycle outside of a predetermined load limit, based on the load data; and
automatically decrement a second set of the target motor speeds corresponding to portions of the stroke cycle within the predetermined load limit, thereby generating a second motor speed profile; and to control the motor according to the second motor speed profile.

40. The pumpjack motor system of claim 39, wherein at least one of the sensors comprises a load sensor.

41. The pumpjack motor system of claim 40, wherein the load sensor is responsive to load of a polish rod of the pumpjack.

42. The pumpjack motor system of claim 39, wherein at least one of the sensors comprises a crank rotation sensor.

43. The pumpjack motor system of claim 39, wherein at least one of the sensors comprises a motor shaft position sensor.

44. The pumpjack motor system of claim 39, wherein at least one of the sensors comprises a motor current sensor.

45. The pumpjack motor system of claim 39, wherein the controller is further configured to identify portions of the stroke cycle outside of the predetermined load limit by:
constructing a data structure relating position to load with respect to a polish rod of the pumpjack over the stroke cycle based on the sensory feedback; and
comparing the data structure to the predetermined load limit.

46. The pumpjack motor system of claim 39, wherein the predetermined load limit corresponds to the structural integrity of the polish rod.

47. The pumpjack motor system of claim 39, wherein the predetermined load limit corresponds to the structural integrity of a gear box coupled to the motor and the polish rod.

48. The pumpjack motor system of any claim 39, wherein the electric motor comprises a regenerative drive configured to provide a breaking torque to control the descent of a rod system of the pumpjack during a downstroke of each stroke cycle while simultaneously converting kinetic energy of the rod system into electrical power.

49. A pumpjack motor system, comprising:
an electric motor coupled to a gear box of a pumpjack;
one or more sensors mounted to monitor at least one operating condition of the pumpjack; and
a local controller coupled to the electric motor and the one or more sensors and operable, while the pumpjack continuously pumps fluid over two sequential pumping cycles, to:
control the electric motor through a first of the two sequential pumping cycles, according to a first motor speed profile having a predetermined default setting and comprising a plurality of target motor speeds corresponding to respective portions of the pumpjack stroke cycle, while receiving sensory feedback from the one or more sensors;
automatically adjust one or more of the target motor speeds as a function of the sensory feedback, to generate an adjusted motor speed profile; and to
control the motor according to the adjusted motor speed profile during a second of the two sequential pumping cycles of the pumpjack.

50. The pumpjack motor system of 49, wherein the first motor speed profile comprises an altered version of a motor speed profile utilized in a previous pump stroke cycle of the sequence.

51. The pumpjack motor system of claim 49, wherein at least one of the sensors comprises a load sensor.

52. The pumpjack motor system of claim 51, wherein the load sensor is responsive to load of a polish rod of the pumpjack.

53. The pumpjack motor system of claim 49, wherein at least one of the sensors comprises a crank rotation sensor.

54. The pumpjack motor system of claim 49, wherein at least one of the sensors comprises a motor shaft position sensor.

55. The pumpjack motor system of claim 49, wherein at least one of the sensors comprises a motor current sensor.

56. The pumpjack motor system of claim 49, wherein the local controller is configured to automatically adjust the one or more of the target motor speeds by first constructing a data structure relating position to load with respect to a polish rod of the pumpjack over the first pump stroke cycle based on the sensory feedback.

57. The pumpjack motor system of claim 56, wherein the local controller is configured to determine the one or more speed adjustment values by also comparing the data structure to one or more predetermined load limits.

58. The pumpjack motor system of claim 57, wherein at least one of the predetermined load limits corresponds to structural integrity of the polish rod.

59. The pumpjack motor system of claim 57, wherein at least one of the predetermined load limits corresponds to structural integrity of a gear box coupled to the motor and the polish rod.

60. The pumpjack motor system of claim 56, wherein the local controller is configured to determine the one or more speed adjustment values by also identifying an abrupt load spike based on the data structure.

61. The pumpjack motor system of claim 56, wherein the data structure comprises a dynamometer surface card.

62. The pumpjack motor system of claim 56, wherein the data structure comprises a downhole pump card.

63. The pumpjack motor system of claim 49, wherein the local controller is configured to automatically adjust the one or more of the target motor speeds by:
detecting a detrimental operating condition within the first pump stroke cycle based on the sensory feedback; and
selecting a speed adjustment value to increase the target motor speed at a control period within the second pump stroke cycle preceding or subsequent to a different control period where the detrimental operating condition is likely to reoccur.

64. The pumpjack motor system of claim 49, wherein the local controller is configured to automatically adjust the one or more of the target motor speeds by:
detecting a detrimental operating condition within the first pump stroke cycle based on the sensory feedback; and
selecting a speed adjustment value to decrease the target motor speed at a control period within the second pump stroke cycle where the detrimental operating condition is likely to reoccur.

65. The pumpjack motor system of claim 49, wherein the local controller is configured to automatically adjust the one or more of the target motor speeds by:
detecting a detrimental operating condition within the first pump stroke cycle based on the sensory feedback; and
selecting a speed adjustment value to decrease the target motor speed at a control period within the second pump stroke cycle preceding a different control period where the detrimental operating condition is likely to reoccur.

66. The pumpjack motor system of claim 49, wherein the electric motor comprises a regenerative drive configured to provide a breaking torque to control the descent of a rod system of the pumpjack during a downstroke of each of the stroke cycles while simultaneously converting kinetic energy of the rod system into electrical power.

67. A pumpjack motor system, comprising:
an electric motor coupled to a gear box of a pumpjack;
a controller operating, as the pumpjack continuously pumps fluid, to:
receive sensory feedback at a data sampling frequency of at least one data point per discrete control period of the pumping cycle;
continually receive sensory feedback from one or more sensors mounted to monitor at least one operating condition of the pumpjack;
determine, for each of a plurality of pumpjack stroke cycles, and as a function of the sensory feedback, a unique motor speed profile comprising a plurality of target motor speeds corresponding to each of a plurality of discrete periods within the respective stroke cycle of the pumpjack;
automatically identify, from among the motor speed profiles corresponding to the respective pumpjack stroke cycles, an optimized motor speed profile with respect to pumping efficiency and one or more structural load limits; and then to control the electric motor according to the optimized motor speed profile.

68. The pumpjack motor system of claim 67, further comprising a variable frequency drive communicatively coupled to the controller and the motor, so as to receive a plurality of target motor speeds from the controller and regulate the motor to achieve the target motor speeds.

69. The pumpjack motor system of claim 68, wherein at least one of the sensors comprises a load sensor.

70. The pumpjack motor system of claim 67, wherein the load sensor is responsive to load of a polish rod of the pumpjack.

71. The pumpjack motor system of claim 67, wherein at least one of the sensors comprises a crank rotation sensor.

72. The pumpjack motor system of claim 67, wherein at least one of the sensors comprises a motor shaft position sensor.

73. The pumpjack motor system of claim 67, wherein at least one of the sensors comprises a motor current sensor.

74. The pumpjack motor system of claim 67, wherein the controller operates to determine the unique motor speed profile by monitoring the anticipated load on the rods and/or gear box of the pumpjack, and staying within predetermined stress limits or envelopes.

75. The pumpjack motor system of claim 67, wherein the controller operates to determine the unique motor speed profile by detecting an onset of pump off and adjusting a subsequent iteration of the motor speed profile to relieve an imminent pump off condition.

76. The pumpjack motor system of claim 67, wherein the controller operates to determine the unique motor speed profile by detecting a discrete stress event, and adjusting a subsequent iteration of the motor speed profile to relieve the discrete stress event.

77. The pumpjack motor system of any claim 67, wherein the controller is further configured to predict a future pump off or stress event based on historical pattern matching.

78. The pumpjack motor system of claim 67, wherein the controller is further configured to adjust the optimized motor speed profile based on changing operating conditions.

79. The pumpjack motor system of claim 67, wherein the unique motor speed profile for each pump stroke cycle comprises a motor speed profile from a previous pump stroke cycle altered according to a speed adjustment applied to one or more target motor speeds.

80. The pumpjack motor system of claim 79, wherein a magnitude of the speed adjustment is limited according to a predetermined maximum target speed difference between adjacent cycle portions.

81. The pumpjack motor system of claim 79, wherein the speed adjustment comprises a speed decrement determined based on a detected deviation from a historic load profile.

82. The pumpjack motor system of claim 67, wherein the electric motor comprises a regenerative drive configured to provide a breaking torque to control descent of a rod system of the pumpjack during a downstroke of each stroke cycle while simultaneously converting kinetic energy of the rod system into electrical power.

83. A method of operating a pumpjack, the method comprising:
 operating an electric motor of a pumpjack to pump fluid, according to a predetermined motor speed profile comprising a plurality of target motor speeds corresponding to each of a plurality of discrete control periods within a stroke cycle of the pumpjack, while receiving sensory feedback comprising data collected from one or more sensors mounted to monitor at least one operating condition of the pumpjack;
 one or more of the plurality of discrete control periods comprise a time duration of between about 5 and 100 milliseconds;
 while continuing to operate the electric motor to pump fluid, increasing one or more of the plurality of target motor speeds over a plurality of stroke cycles until onset of a detrimental operating condition is detected based on sensory feedback; and
 in response to detecting the onset of the detrimental operating condition, and as the pumpjack continues to pump fluid, adjusting the motor speed profile to simultaneously avoid the detrimental operating condition and increase the rate of fluid production by:
 decreasing a first subset of the plurality of target motor speeds within a first region of the stroke cycle; and
 increasing a second subset of the plurality of target motor speeds within a second region of the stroke cycle.

84. The method of claim 83, wherein the plurality of discrete control periods comprise control periods.

85. The method of claim 83, wherein each of the plurality of discrete control periods comprise an identical time duration.

86. The method of claim 83, wherein at least one of the sensors comprises a load sensor.

87. The method of claim 86, wherein the load sensor is responsive to load of a polish rod of the pumpjack.

88. The method of claim 83, wherein at least one of the sensors comprises a crank rotation sensor.

89. The method of claim 83, wherein at least one of the sensors comprises a motor shaft position sensor.

90. The method of claim 83, wherein at least one of the sensors comprises a motor current sensor.

91. The method of claim 83, wherein increasing the one or more target motor speeds comprises incrementally increasing each of the plurality of target motor speeds according to a predetermined adjustment schedule.

92. The method of claim 83, wherein the onset of the detrimental operating condition is detected by:
 constructing a data structure relating position to load with respect to a polish rod of the pumpjack over the stroke cycle based on the sensory feedback; and
 comparing the data structure to one or more predetermined load limits.

93. The method of claim 92, wherein at least one of the predetermined load limits corresponds to structural integrity of the polish rod.

94. The method of claim 92, wherein at least one of the predetermined load limits corresponds to structural integrity of a gear box coupled to the motor and the polish rod.

95. The method of claim 83, wherein the onset of the detrimental operating condition is detected by:
 constructing a data structure relating position to load with respect to a polish rod of the pumpjack over the stroke cycle based on the sensory feedback; and
 identifying an abrupt load spike based on the data structure.

96. The method of claim 83, wherein decreasing the first subset of the plurality of target motor speeds comprises decreasing the target motor speed at one or more control periods preceding a different control period where the detrimental operating condition is likely to reoccur.

97. The method of claim 83, wherein decreasing the first subset of the plurality of target motor speeds comprises decreasing the target motor speed at a control period where the detrimental operating condition is likely to reoccur.

98. The method of claim 83, wherein increasing the second subset of the plurality of target motor speeds comprises increasing the target motor speed at a control period where the detrimental operating condition is unlikely to reoccur.

99. The method of claim 83, wherein the electric motor comprises a regenerative drive, and wherein the method further comprises providing a breaking torque to control descent of a rod system of the pumpjack during a downstroke of each of the stroke cycles while simultaneously converting kinetic energy of the rod system into electrical power.

* * * * *